(12) United States Patent
Goetz

(10) Patent No.: US 11,238,855 B1
(45) Date of Patent: Feb. 1, 2022

(54) VOICE USER INTERFACE ENTITY RESOLUTION

(71) Applicant: Amazon Technologies, Inc., Seattle, WA (US)

(72) Inventor: Jeromey Russell Goetz, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 87 days.

(21) Appl. No.: 15/715,382

(22) Filed: Sep. 26, 2017

(51) Int. Cl.
| | |
|---|---|
| *G10L 15/22* | (2006.01) |
| *G10L 15/30* | (2013.01) |
| *G10L 13/00* | (2006.01) |
| *G10L 15/18* | (2013.01) |
| *H04L 29/12* | (2006.01) |
| *H04L 29/08* | (2006.01) |

(52) U.S. Cl.
CPC .............. *G10L 15/22* (2013.01); *G10L 13/00* (2013.01); *G10L 15/1815* (2013.01); *G10L 15/30* (2013.01); *H04L 61/1594* (2013.01); *H04L 67/306* (2013.01); *G10L 2015/223* (2013.01); *H04L 67/18* (2013.01); *H04L 67/22* (2013.01)

(58) Field of Classification Search
None
See application file for complete search history.

(56) References Cited

U.S. PATENT DOCUMENTS

| | | | | |
|---|---|---|---|---|
| 6,466,654 | B1* | 10/2002 | Cooper ................... | G10L 13/00 |
| | | | | 379/88.01 |
| 7,444,351 | B1* | 10/2008 | Nomiyama ........... | G06F 40/295 |
| 8,744,995 | B1* | 6/2014 | Hewinson ............. | H04M 1/271 |
| | | | | 707/603 |
| 9,524,526 | B2* | 12/2016 | Ajmera .................. | G06Q 50/01 |
| 10,706,843 | B1* | 7/2020 | Elangovan ............. | G10L 15/22 |
| 2004/0225499 | A1* | 11/2004 | Wang .................. | H04M 3/4936 |
| | | | | 704/257 |
| 2007/0033053 | A1* | 2/2007 | Kronenberg .......... | H04M 3/493 |
| | | | | 704/275 |
| 2009/0201270 | A1* | 8/2009 | Pikkujamsa .......... | G06F 1/1684 |
| | | | | 345/184 |
| 2010/0161736 | A1* | 6/2010 | Picknelly ............. | G06Q 10/107 |
| | | | | 709/206 |
| 2010/0273447 | A1* | 10/2010 | Mann ................ | H04M 1/72519 |
| | | | | 455/405 |
| 2012/0157067 | A1* | 6/2012 | Turner .................... | H04M 3/48 |
| | | | | 455/417 |

(Continued)

*Primary Examiner* — Neeraj Sharma
(74) *Attorney, Agent, or Firm* — Pierce Atwood LLP

(57) ABSTRACT

Techniques for resolving ambiguous recipient users and/or recipient devices are described. A system receives input data from a device. The system may determine the input data corresponds to a spoken utterance requesting a call be established. When the system determines the recipient user and/or the recipient device is ambiguous, the system determines communications pattern data associated with the originating device. The system also determines context data. Based on the communications pattern data and the context data, the system may resolve an identity of the recipient user and/or resolve an identity of the recipient device. The system may also use communications pattern data and context data to determine when a device is likely to receive a communication and output content indicating same to a user.

18 Claims, 17 Drawing Sheets

(56) References Cited

U.S. PATENT DOCUMENTS

| | | | |
|---|---|---|---|
| 2013/0185285 A1* | 7/2013 | Shuman | H04L 51/04 707/722 |
| 2014/0137043 A1* | 5/2014 | Matas | H04M 1/72469 715/835 |
| 2014/0365216 A1* | 12/2014 | Gruber | G10L 15/265 704/235 |
| 2015/0142704 A1* | 5/2015 | London | G06F 16/90332 706/11 |
| 2015/0350168 A1* | 12/2015 | Hayton | H04L 63/0869 713/168 |
| 2016/0112358 A1* | 4/2016 | Ghafourifar | H04L 51/12 709/206 |
| 2016/0286007 A1* | 9/2016 | Selfridge | G06F 16/252 |
| 2016/0330318 A1* | 11/2016 | Papakipos | H04M 3/42042 |
| 2017/0061005 A1* | 3/2017 | Purcell | G06Q 50/01 |
| 2017/0142094 A1* | 5/2017 | Doitch | H04L 63/102 |
| 2018/0032503 A1* | 2/2018 | Swart | G06F 16/219 |
| 2018/0039705 A1* | 2/2018 | Eyal | G06F 16/9537 |
| 2018/0091487 A1* | 3/2018 | Lin | H04L 9/0825 |
| 2018/0232662 A1* | 8/2018 | Solomon | G06N 20/00 |
| 2018/0260926 A1* | 9/2018 | Bambocci | G06Q 50/26 |
| 2018/0309866 A1* | 10/2018 | Devaraj | H04M 1/72433 |
| 2018/0342151 A1* | 11/2018 | VanBlon | G06F 3/167 |
| 2019/0026456 A1* | 1/2019 | Hon | H04L 63/102 |
| 2019/0028557 A1* | 1/2019 | Modi | G06F 21/316 |
| 2019/0089694 A1* | 3/2019 | Newton | G06F 21/6218 |
| 2020/0169787 A1* | 5/2020 | Pearce | H04N 21/4755 |

\* cited by examiner

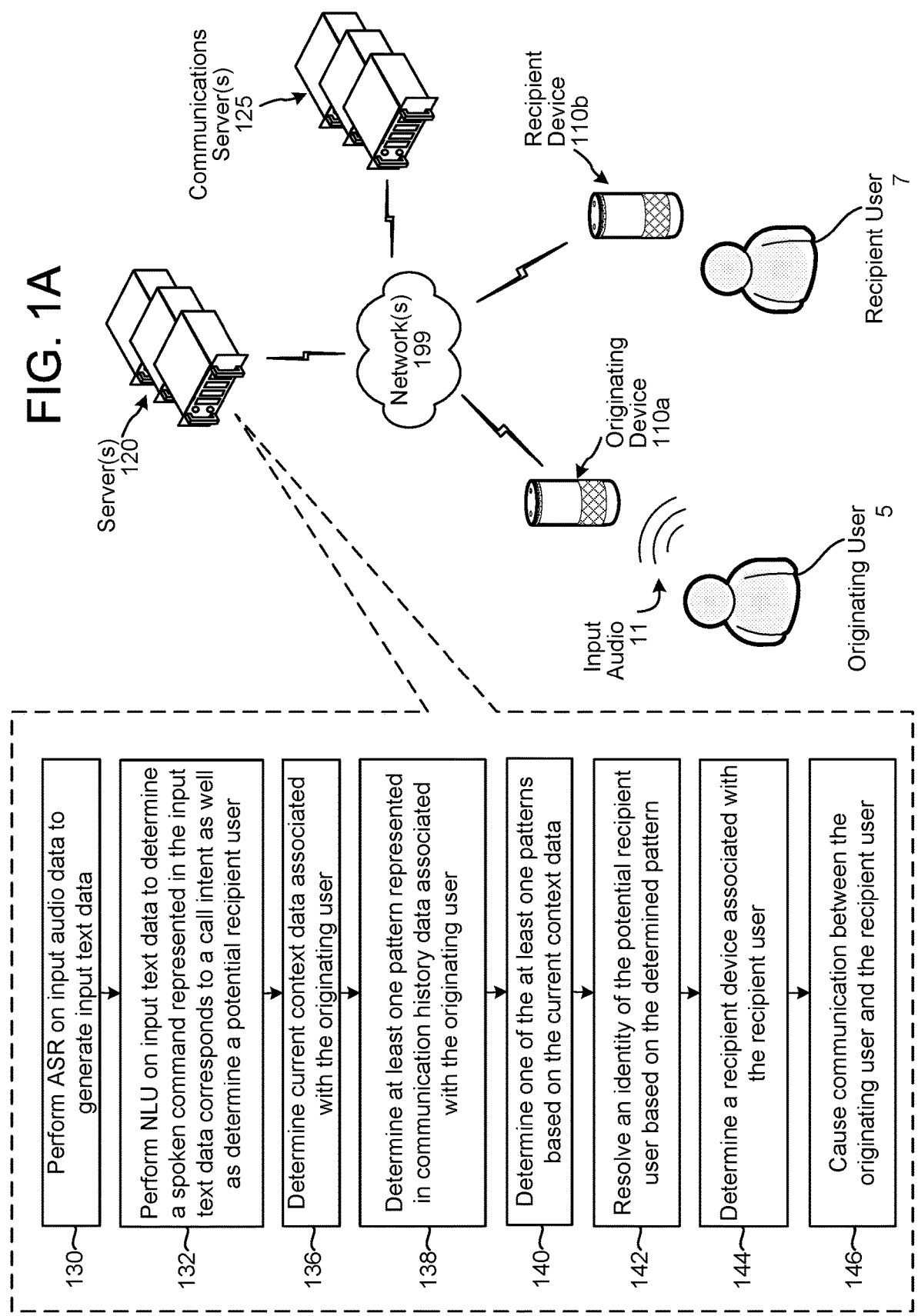

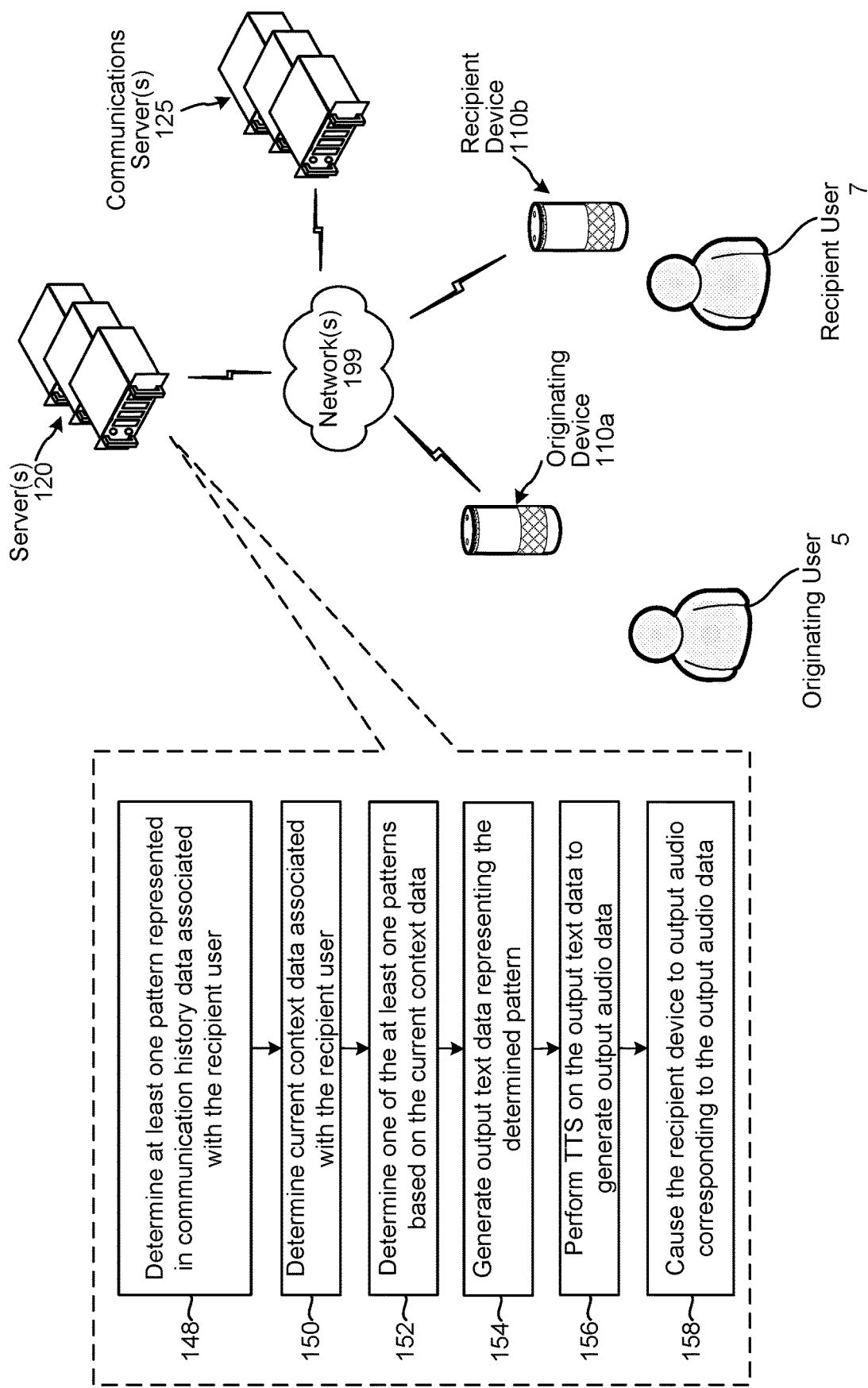

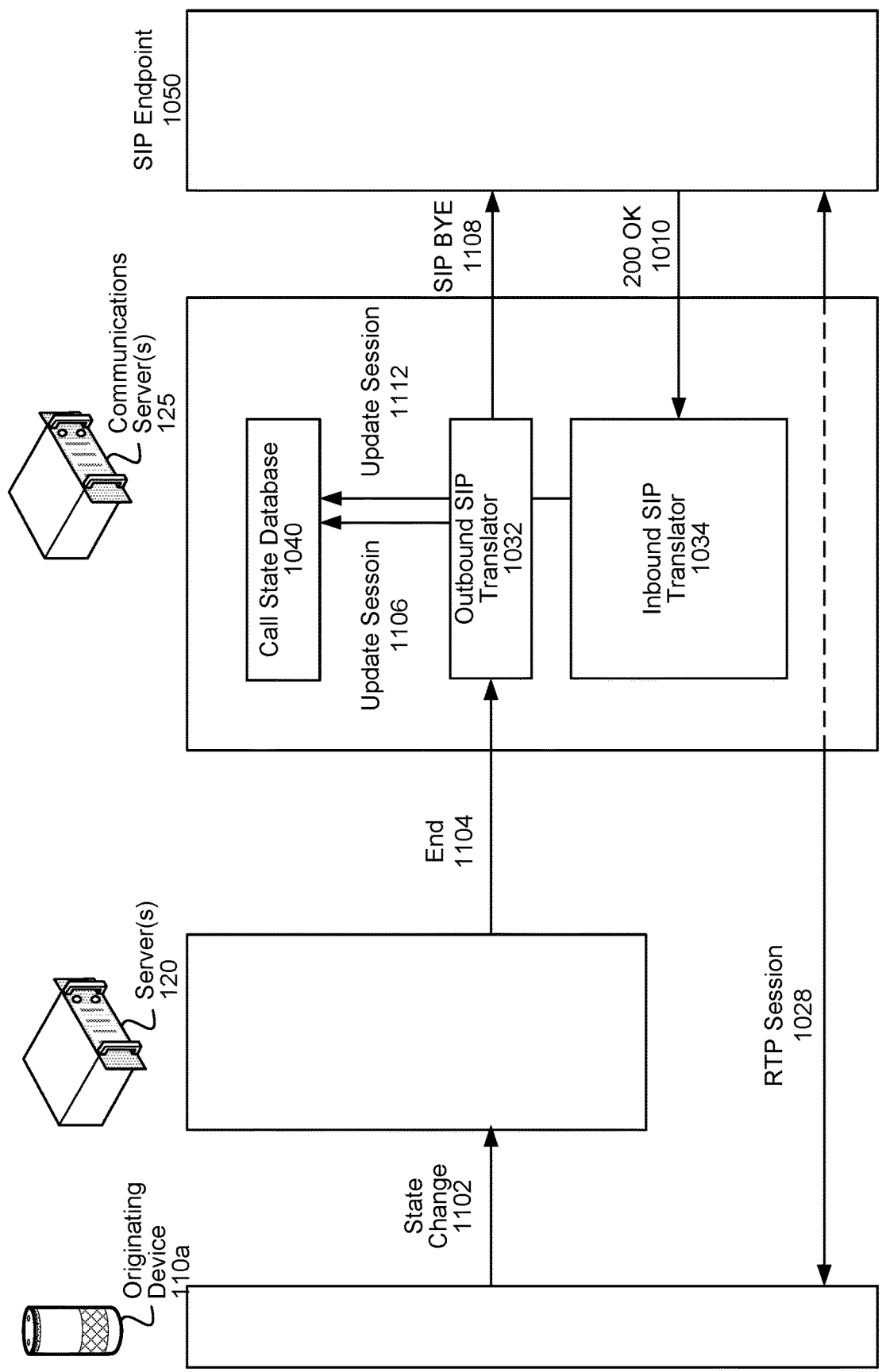

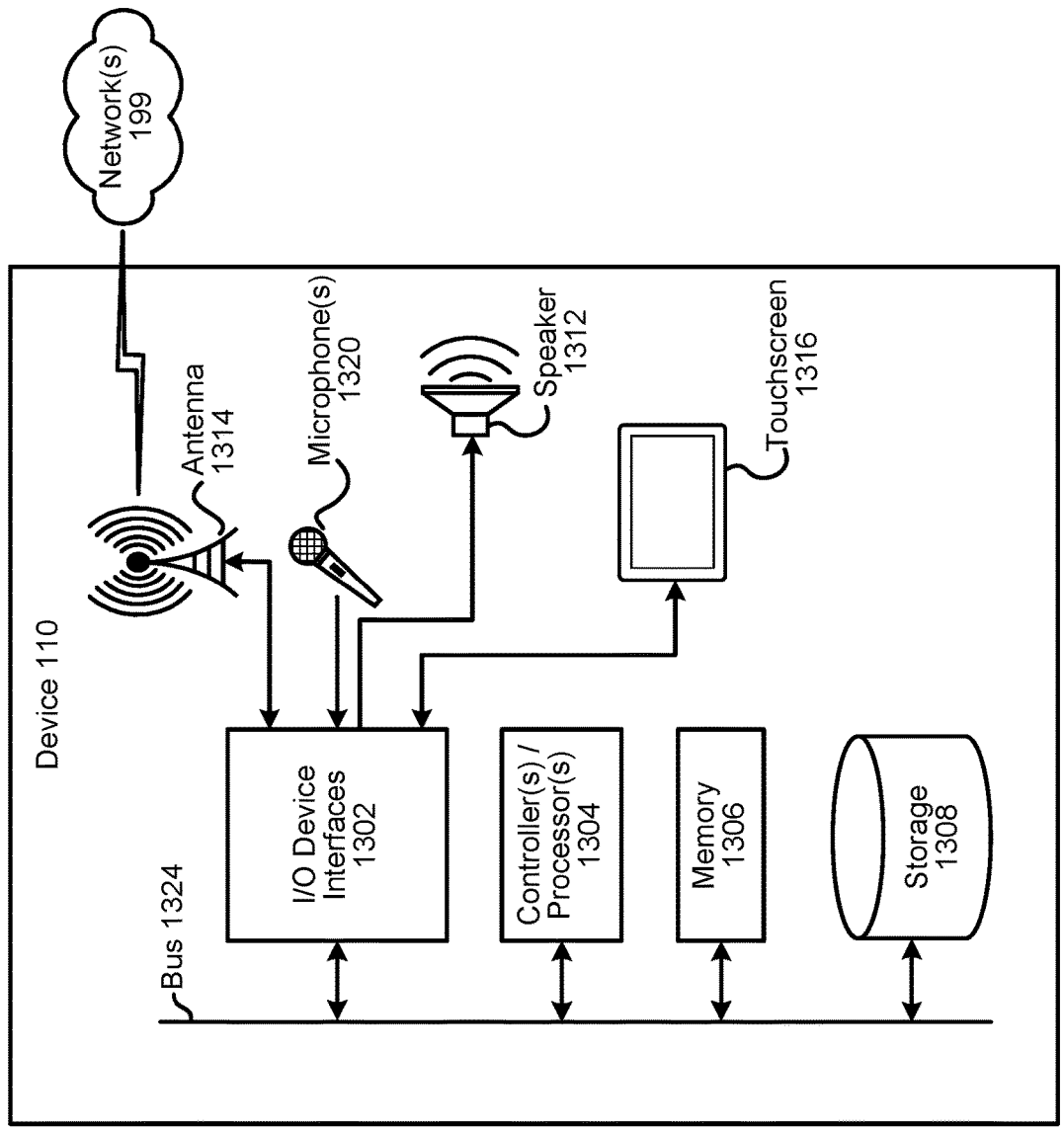

VOICE USER INTERFACE ENTITY RESOLUTION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A illustrates a system configured to resolve an identity of a recipient user according to embodiments of the present disclosure.

FIG. 1B illustrates a system configured to output a prompt to a recipient user according to embodiments of the present disclosure.

FIG. 11A-11B illustrate examples of signaling to end a communication session according to embodiments of the present disclosure.

FIG. 13 is a block diagram conceptually illustrating example components of a device according to embodiments of the present disclosure.

DETAILED DESCRIPTION

Figure 2:
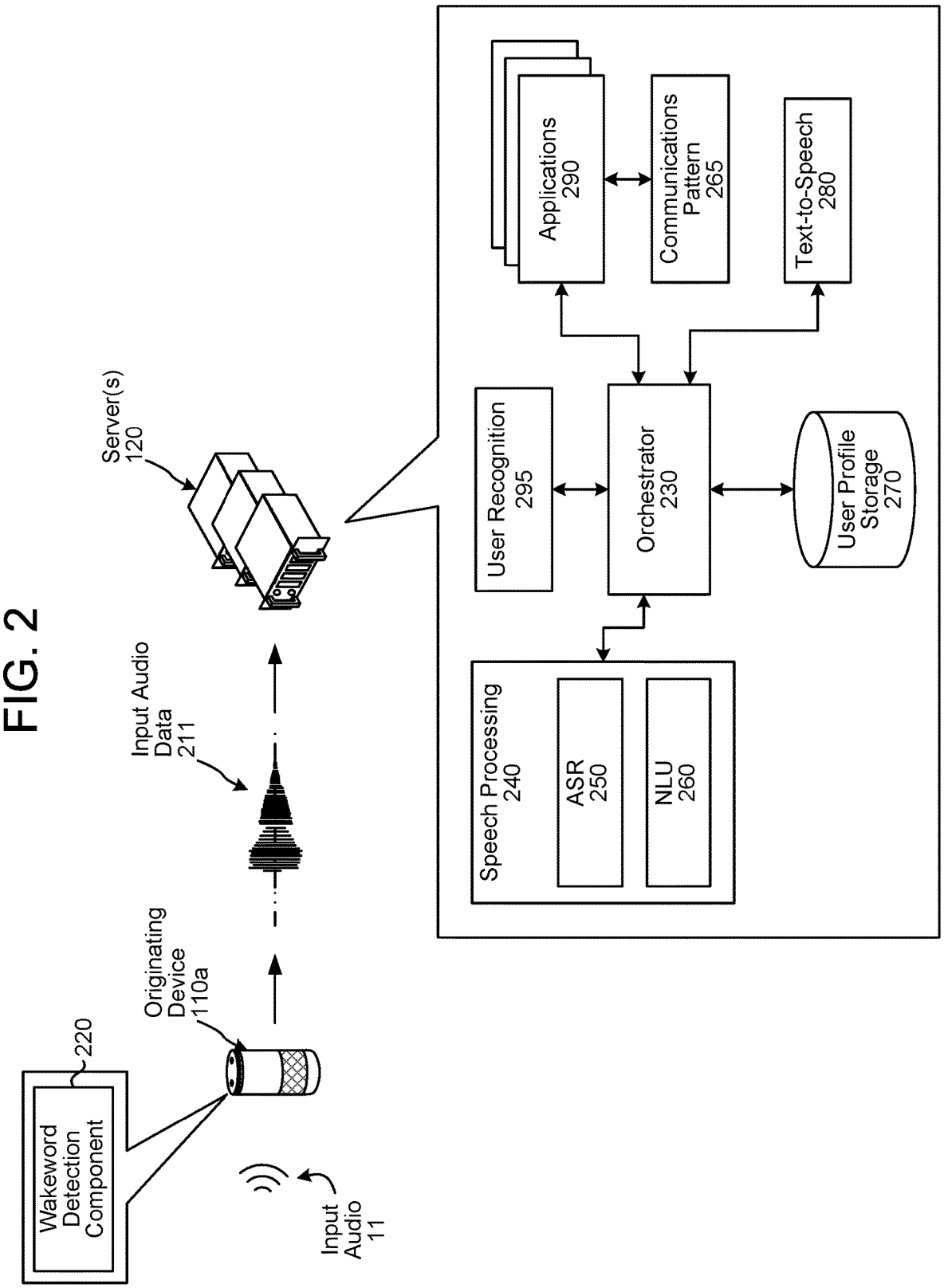
FIG. 2 is a conceptual diagram of components of a system according to embodiments of the present disclosure.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system.

A speech controlled computing system may answer user commands requesting the output of content. For example, a user may say "Alexa, what is the weather." In response, the system may output weather information. For further example, a user may say "Alexa, play Adele." In response, the system may output music sang by Adele. Yet further, for example, a user may say "Alexa, call John Smith." In response, the system may establish a call between the user's device and a device associated with John Smith.

A speech controlled computing system may also provide communications functionality (e.g., calls or messaging) between two or more users. For example, a user may say "Alexa, call Joe." If a contact list of the user includes multiple "Joes," the system may output computerized speech corresponding to "which Joe would you like to call?" If the contact list of the user only includes one "Joe," the system may output computerized speech corresponding to "Joe Smith, correct?" When the user responds to the computerized speech by either saying the full name of the Joe the user wants to call or indicates the individual represented in the computerized speech is correct, depending on the situation, the system establishes a call between the user's device and a device of the recipient individual.

The present disclosure improves speech controlled computing systems by enabling the system to resolve the recipient of a call or message without needing to have the originating user confirm the recipient's identity. The system analyzes previous instances of system communications that a user was involved in to determine communication patterns. Such patterns may recur on a specific day of a week, a specific day of a month, a specific day of a year, etc.

An originating user may request the system make a call to a recipient user, for example by speaking "Alexa, call Joe" to a device. The system may use pre-determined pattern information and other present context information to resolve an identity of the recipient user (e.g., Joe). For example, the system may determine it is about 6:00 pm on a Sunday for a particular user. The system may also determine that the originating user's previous interaction history represents a pattern where the originating user routinely calls Joe Smith on Sundays around 6:00 pm. The system may thus determine the recipient user is Joe Smith and may establish a call between the originating user's device and Joe Smith's device without needing to ask the originating user to confirm s/he wants to call Joe Smith.

As described, the current context information used by the system to determine an applicable pattern may include time information, date information as well as other information. For example, the current context information may also include location information. For example, a pattern may indicate that the originating user routinely calls Joe Smith at about 6:00 pm on Sundays, but only using a device located in a kitchen of the originating user's house. The current context information may also include presence information. For example, a pattern may indicate that the originating user routinely calls Joe Smith at about 6:00 pm on Sundays, but only when three individuals (e.g., the originating user and his/her family) are present. The current context information may include other kinds of information as described in detail below.

FIGS. 1A and 1B illustrate a system in which devices (110a/110b) local to respective users (5/7), one or more server(s) 120, and one or more communications servers 125 may communicate across one or more networks 199. Although the figures and discussion illustrate certain operational steps of the system in a particular order, the steps described may be performed in a different order (as well as certain steps removed or added) without departing from the intent of the disclosure.

FIG. 1A illustrates a system configured to resolve an identity of a recipient user. An originating user 5 speaks a command requesting a communication be established (e.g., a two-way call) or performed (e.g., sending of a message), such as "Alexa, call Joe" or "Alexa, send Joe a message." One or more microphones of an originating device 110a capture input audio 11 corresponding to the spoken command. The originating device 110a generates input audio data corresponding to the input audio 11 and sends the input audio data to the server(s) 120.

The server(s) 120 receives the input audio data and performs (130) ASR on the input audio data to generate input text data. The server(s) 120 performs (132) NLU on the input text data to determine a spoken command represented in the input text data corresponds to a <Call> intent as well as determine a potential recipient user. For example, if the spoken command corresponds to "Alexa, call Joe," the server(s) 120 may determine "Joe" as being the potential recipient user. At this point, the server(s) 120 has not made a determination regarding the identity of "Joe."

The server(s) 120 determines (136) current context data associated with the originating user 5. The current context data may include information representing a geographic location of the originating device 110a, time information, date information, originating user 5 information, and/or information indicating a number of individuals detectable by the originating device 110a. The aforementioned list of information represented in the current context data is not exhaustive. Thus, it should be appreciated that the current context data may include additional or other information than what is explicitly detailed above.

The server(s) 120 determines communication history data associated with the originating user 5, and determines (138) at least one pattern represented in the communication history data. For example, a pattern may correspond to the originating user 5 calling a particular recipient user every day at about 5:00 pm. For further example, a pattern may correspond to the originating user 5 calling a particular recipient user every Sunday at about 6:00 pm using an originating device 110a located in the originating user's kitchen. Other patterns are also possible.

The server(s) 120 determines (140) one of the determined at least one patterns that is applicable to the current communication based on the current context data. As described, each pattern may be associated with a particular recipient user. The server(s) 120 may resolve (142) an identity of the potential recipient user based on the determined pattern. For example, if the potential recipient user corresponds to "Joe" and the pattern is associated with "Joe Smith," the server(s) 120 may resolve the potential recipient user 7 to be "Joe Smith."

The server(s) 120 determines (144) a recipient device 110b associated with the recipient user 7. The recipient device 110b may communicate directly with the server(s) 120 via the network(s) 199. Alternatively, the recipient device 110b may communication with a telephone network, which communicates with the server(s) 120 via the network(s) 199. The server(s) 120 then causes (146) communication to occur between the originating user 5 and the recipient user 7. The communication between the originating user 5 and the recipient user 7 may be facilitated by a communications server(s) 125. For example, if the user spoke "Alexa, call Joe," the server(s) 120 may establish a two-way communication channel between the originating device 110a and the recipient device 110b. A two-way communication channel may correspond to a phone call, Voice Over Internet Protocol (VOIP) call, etc. For further example, if the user spoke "Alexa, send Joe a message," the server(s) 120 may send output audio data corresponding to message content to the recipient device 110b.

FIG. 1B illustrates a system configured to output a prompt to a recipient user 7. The server(s) 120 determines (148) at least one pattern represented in communication history data associated with the recipient user 7. The server(s) 120 also determines (150) current context data associated with the recipient user 7. The server(s) 120 determines (152) one of the determined at least one patterns based on the current context data.

The system may proactively prompt the recipient user 7 with respect to future potential communications. The server(s) may generate (154) output text data representing the determined pattern. For example, the output text data may correspond to "John may be calling you in 5 minutes based on your previous calls with John." The server(s) 120 may cause text represented in the output text data to be presented on a display of the recipient device 110b. Alternatively, the server(s) 120 may perform (156) TTS on the output text data to generate output audio data and may cause (158) the recipient device 110b to output audio corresponding to the output audio data.

The system may operate using various components as described in FIG. 2. The various components may be located on a same or different physical devices. Communication between various components may occur directly or across a network(s) 199.

The originating device 110a may receive input audio 11, corresponding to a spoken utterance corresponding at least in part to a command, using an audio capture component, such as a microphone or array of microphones. The originating device 110a, using a wakeword detection component 220, processes audio data corresponding to the input audio 11 to determine if a keyword (e.g., a wakeword) is detected in the audio data. Following detection of a wakeword, the originating device 110a sends input audio data 211, corresponding to the utterance, to the server(s) 120.

Upon receipt by the server(s) 120, the input audio data 211 may be sent to an orchestrator component 230. The orchestrator component 230 may include memory and logic that enables the orchestrator component 230 to transmit various pieces and forms of data to various components of the system.

The orchestrator component 230 sends the input audio data 211 to a speech processing component 240. An ASR component 250 of the speech processing component 240 transcribes the input audio data 211 into input text data representing one more hypotheses representing speech contained in the input audio data 211. The ASR component 250 interprets the utterance in the input audio data 211 based on a similarity between the utterance and pre-established language models. For example, the ASR component 250 may compare the input audio data 211 with models for sounds (e.g., subword units, such as phonemes, etc.) and sequences of sounds to identify words that match the sequence of sounds spoken in the utterance represented in the input audio data 211. The ASR component 250 sends the input text data generated thereby to an NLU component 260 of the speech processing component 260. The input text data sent from the ASR component 250 to the NLU component 260 may include a top scoring hypothesis or may include an N-best list including multiple hypotheses. An N-best list may additionally include a score associated with each hypothesis represented therein. Each score may indicate a confidence of ASR processing performed with respect to the hypothesis with which it is associated.

The NLU component 260 attempts to make a semantic interpretation of the phrases or statements represented in the input text data input therein. That is, the NLU component 260 determines one or more meanings associated with the phrases or statements represented in the input text data based on individual words represented in the input text data. The NLU component 260 determines an intent (e.g., an action that a user desires be performed) representing the spoken utterance represented in the input text data as well as pertinent pieces of information in the input text data that allow a device (e.g., the originating device 110a, the recipient device 110b, the server(s) 120, the communications server(s) 125, etc.) to execute the intent. For example, if the input text data corresponds to "call mom," the NLU component 260 may determine a <Call> intent (e.g., representing a user intended to establish a call) and determine a potential recipient user as "mom."

The system may include a communications pattern component 265 that determines patterns in data representing previous system communications. The communications pattern component 265 takes as input data representing previous system communications (e.g., calls, messages, etc.) of various system users. With respect to each user, the communications pattern component 265 determines the presence of one or more patterns in the user's previous communications. The patterns may be established based on events occurs on a daily basis, weekly basis, monthly basis, yearly basis, etc.). Moreover, patterns may be established based on events occurring with respect to specific times, locations, etc. The communications pattern component 265 may be included in the system, for example, as part of server(s) 120, and/or the communications pattern component 265 may be included with and controlled by an application 290, such as a communication application associated with communication server(s) 125. Different communication applications may include different communication pattern components for purposes of performing the operations described herein differently depending on the different communication application being invoked.

The communications pattern component 265 may determine patterns based on absolute date. For example, the communications pattern component 265 may determine a user calls a recipient on August $28^{th}$ every year. The communications pattern component 265 may also determine patterns based on non-absolute data. For example, the communications pattern component 265 may determine a user calls a recipient every Sunday, a user calls a recipient every other Thursday, etc. The communications patterns component 265 may also determine patterns based on time. For example, the communications patterns component 265 may determine a user calls a recipient every Sunday at about 6:00 pm. The communications pattern component 265 may also determine patterns based on presence data. For example, the communications pattern component 265 may determine a user calls a recipient every Sunday at about 6:00 pm when the user's family is present with the user (e.g., the user and his/her family may all engage with the same user device). The communications pattern component 265 may also determine patterns based on location. For example, the communications pattern component 265 may determine a user calls a recipient every Sunday at about 6:00 pm from a device 110 in a kitchen of the user's house. The communications pattern component 265 may also determine patterns based on content presented on a screen of a device 110. For example, an originating user 5 may routinely call his/her mom when recipe content is presented whereas the originating user 5 may routinely call his/her dad when sports content is presented. The communications pattern component 265 may determine other patterns as well.

The communications pattern component 265 may maintain historical data separate from historical data maintained by the speech processing component 240. For example, the communications pattern component 265 may maintain data relating to previous communications established by the system (for example, for communications specific to a particular application 290a) whereas the speech processing component 240 may maintain data relating to ASR and NLU processing of data.

The communications pattern component 265 may determine patterns in system communications as the system performs the communications. Alternatively, the communications pattern component 265 may determine patterns in system communications only when the communications pattern component 265 receives a request for pattern data 604 from a communications application 290a (described in detail herein below with respect to FIG. 6).

The communications pattern component 265 may determine a pattern even if each instance of the same communication is not identical. For example, if a user calls Joe Smith on Sunday at 6:01 pm a first time, calls Joe Smith the next Sunday at 6:07 pm, and calls Joe Smith the next Sunday at 5:52 pm, the communications pattern component 265 may recognize a pattern among these interactions even though they each occurred at a different time. The pattern determined therefrom may be, for example, the user calls Joe Smith every Sunday at about 6:00 pm.

The communications pattern component 265 may also determine a pattern even if a frequency of the same communications slightly deviates. For example, if a user calls Joe Smith every Sunday, the communications pattern component 265 may determine the pattern exists even if the user infrequently (e.g., once a month, once every two months, etc.) does not call Joe Smith on a Sunday.

The communications pattern component 265 may implement decay models that prevent the communications pattern component 265 from outputting pattern information that is not current. Once a user has engaged in enough ritualistic communications, the communications pattern component 265 recognizes a pattern corresponding to the ritualistic communications. The user may stop engaging in the ritualistic communications after the communications pattern component 265 has recognized the pattern. When this occurs, the pattern may be considered to have decayed and the communications pattern component 265 may no longer consider the pattern a pattern. Alternatively, after the communications pattern component 265 recognizes the pattern, the user may change the frequency at which the user engages in the ritualistic communications. For example, the pattern may correspond to a frequency of every week, and the user engaged in communications every other week at some point in time after the pattern is recognized. When this occurs, the pattern may be considered to have decayed and the communications pattern component 265 may no longer consider the pattern a pattern. If the user engages in the communications at the new frequency long enough, the communications pattern component 265 may recognize a new pattern associated with the new frequency.

The communications pattern component 265 may implement various rules that enable the communications pattern component 265 to determine patterns. Alternatively, the communications tend component 265 may run one or more machine learned models that determine patterns. The model(s) run by the communications pattern component 265 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component, such as the communications pattern component 265, requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The server(s) 120 may include a user recognition component 295. The user recognition component 295 may take as input the input audio data 211 and/or input text data output by the ASR component 250. The user recognition component 295 determines scores indicating whether input spoken utterance originated from a particular user. For example, a first score may indicate a likelihood that the input spoken utterance originated from a first user, a second score may indicate a likelihood that the input spoken utterance originated from a second user, etc. The user recognition component 295 also determines an overall confidence regarding the accuracy of user recognition operations. The user recognition component 295 may perform user recognition by comparing speech characteristics in the input audio data 211 to stored speech characteristics of users. The user recognition component 295 may also perform user recognition by comparing biometric data (e.g., fingerprint data, iris data, etc.) received by the system in correlation with the present input utterance to stored biometric data of users. The user recognition component 295 may further perform user recognition by comparing image data (e.g., including a representation of at least a feature of a user) received by the system in correlation with the present input utterance with stored image data (e.g., including representations of features of users). The user recognition component 295 may perform additional user recognition processes, including those known in the art. Output of the user recognition component 295 may be used to inform NLU component processes as well as processing performed by one or more applications 290.

The server(s) 120 may include a user profile storage 270. The user profile storage 270 may include a variety of information related to individual users, groups of users, etc. that interact with the system. The user profile storage 270 may include one or more customer profiles. Each customer profile may be associated with a different customer identifier (ID). A customer profile may be an umbrella profile specific to a group of users. That is, a customer profile encompasses two or more individual user profiles, each associated with a respective unique user ID. For example, a customer profile may be a household profile that encompasses user profiles associated with multiple users of a single household. A customer profile may include preferences shared by all the user profiles encompassed thereby. Each user profile encompassed under a single customer profile may include preferences specific to the user associated therewith. That is, each user profile may include preferences unique from one or more other user profiles encompassed by the same customer profile. A user profile may be a stand-alone profile or may be encompassed under a customer profile. As illustrated, the user profile storage 270 is implemented as part of the server(s) 120. However, it should be appreciated that the user profile storage 270 may be located proximate to the server(s) 120, or may otherwise be in communication with the server(s) 120, for example over the network(s) 199.

FIG. 2 illustrates various 1P applications 290 (e.g., applications maintained and/or operated by the server(s) 120). However, it should be appreciated that the server(s) 120 may additionally or alternatively communicate with one or more application servers executing 3P applications (e.g., applications not maintained and/or operated by the server(s) 120, but in communication with the server(s) 120).

An "application," as used herein, may be considered synonymous with a "skill." A skill may be software akin to an application. That is, a skill may enable the server(s) 120 or other application server(s) (e.g., the communications server(s) 125) to execute specific functionality. The system may be configured with more than one skill. A skill may either be executed by the server(s) 120 or merely associated with the server(s) 120 (i.e., one executed by an application server(s)). For example, a weather skill may enable the server(s) 120 to execute a command with respect to a weather information provider server(s), a ride booking skill may enable the server(s) 120 to execute a command with respect to a taxi or ride sharing provider server(s), an order pizza skill may enable the server(s) 120 to execute a command with respect to a restaurant server(s), etc.

The server(s) 120 may include a TTS component 280 that generates audio data from text data using one or more different methods. In one method of synthesis called unit selection, the TTS component 280 matches text data against a database of recorded speech. The TTS component 280 selects units of recorded speech matching the text data and concatenates the units together to form output audio data. In another method of synthesis called parametric synthesis, the TTS component 280 varies parameters such as frequency, volume, and noise to create output audio data including an artificial speech waveform. Parametric synthesis uses a computerized voice generator, sometimes called a vocoder.

Figure 3:
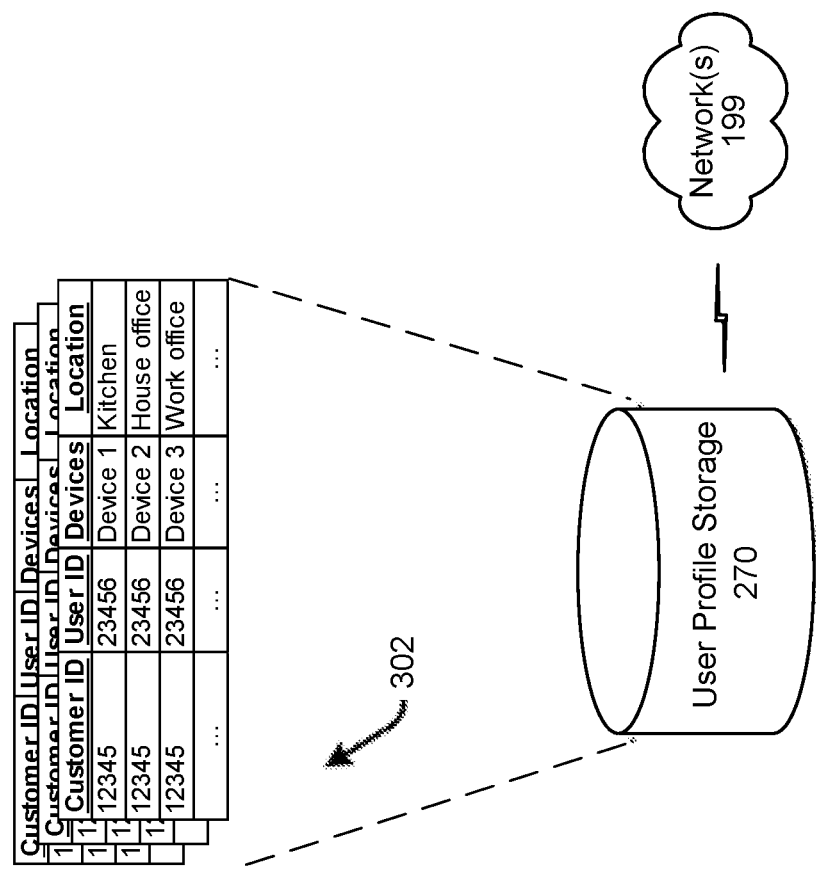
FIG. 3 illustrates data stored and associated with user profiles according to embodiments of the present disclosure.

FIG. 3 illustrates the user profile storage 270 that includes data regarding customer profiles as well as individual user profiles 302. Each user profile 302 may include information indicating various devices. Each user profile 302 may also include location information associated with each device. Each user profile 302 may also be associated with pattern data 604 discussed herein. Each user profile 302 may additionally include other data not explicitly illustrated.

Figure 4:
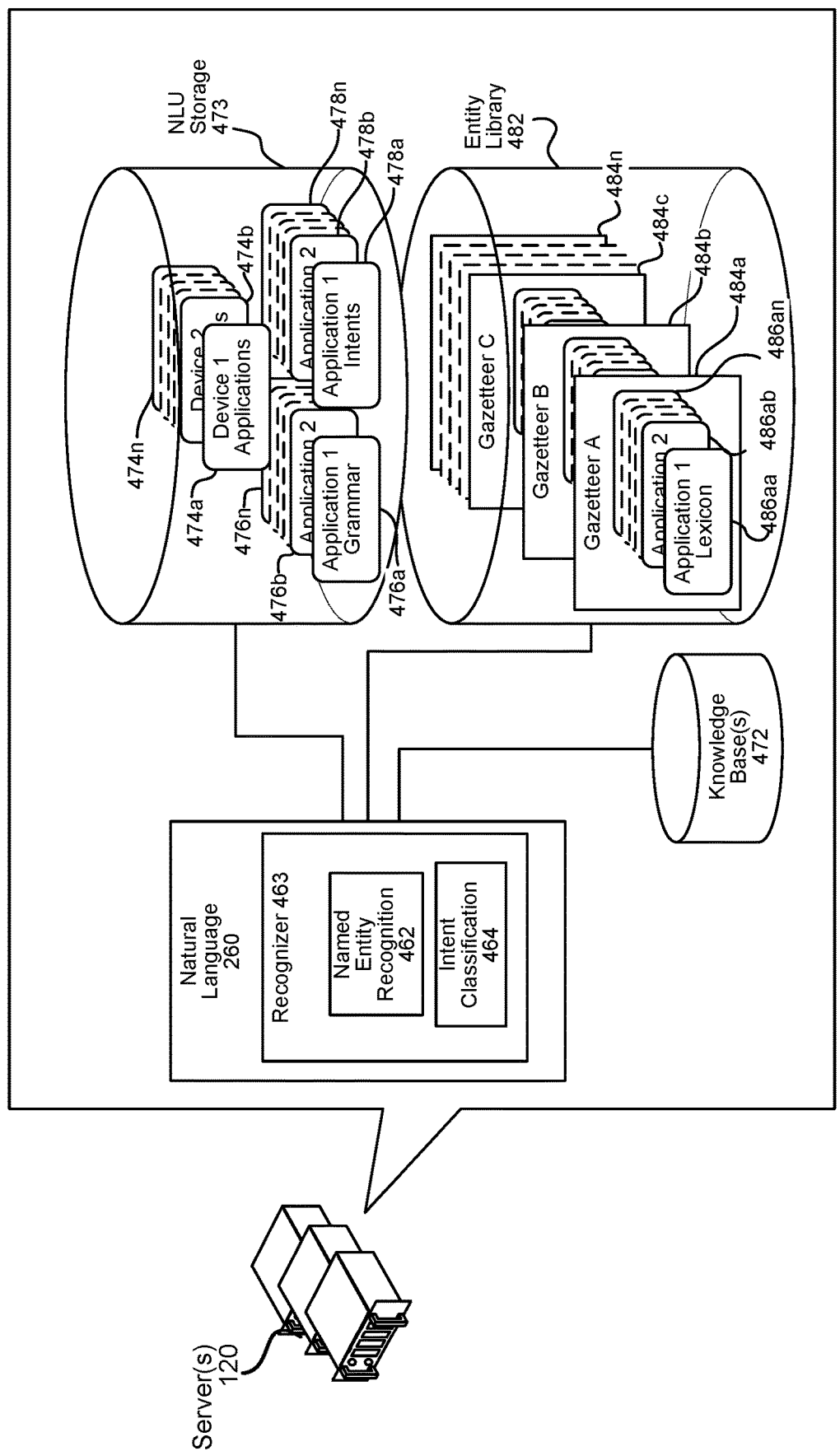
FIG. 4 is a conceptual diagram of how natural language processing is performed according to embodiments of the present disclosure.

FIG. 4 illustrates how NLU processing is performed on input text data. NLU component 260 may process text data including several hypotheses of a single utterance. For example, if the ASR component 250 outputs text data including an N-best list of hypotheses, the NLU component 260 may process the text data with respect to all (or a portion of) the hypotheses represented therein.

The NLU component 260 may annotate text represented in text data by parsing and/or tagging the text. For example, for the text "call Joe," the NLU component 260 may tag "call Joe" as a command as well as tag "Joe" as an entity corresponding to a recipient of the call.

The NLU component 260 may include one or more recognizers 463. Each recognizer 463 may be associated with a different application 290. Each recognizer 463 may process with respect to text data input to the NLU component 260. For example, each recognizer 463 may operate in parallel with other recognizers 463 of the NLU component 260.

Each recognizer 463 may include a named entity recognition (NER) component 462. The NER component 462 attempts to identify grammars and lexical information that may be used to construe meaning with respect to text represented in text data input therein. The NER component 462 identifies portions of text represented in text data input into the NLU component 260 that correspond to a named entity that may be applicable to processing performed by an application 290 associated with the recognizer 463 implementing the NER component 462. The NER component 462 (or other component of the NLU component 260) may also determine whether a word refers to an entity that is not explicitly mentioned in the text, for example "him," "her," "it" or other anaphora, exophora or the like.

Each recognizer 463, and more specifically each NER component 462, may be associated with a particular grammar model and/or database 476, a particular set of intents 478, and a particular personalized lexicon 4386. Each gazetteer 484 may include application-indexed lexical information associated with a particular user and/or device. For example, a Gazetteer A (484a) includes application-index lexical information 486aa to 486an. A user's music application lexical information might include album titles, artist names, and song names, for example, whereas a user's contact list application lexical information might include the names of contacts. Since every user's music collection and contact list is presumably different, this personalized information improves entity resolution (performed by an entity resolution component 570 described below).

An NER component 462 applies grammar models 476 and lexical information 486 associated with the application 290 (associated with the recognizer 463 implementing the NER component 462) to determine a mention of one or more entities in text data input therein. In this manner, the NER component 462 identifies "slots" (i.e., one or more particular words in text data) that may be needed for later processing. The NER component 462 may also label each slot with a type (e.g., noun, place, city, artist name, song name, etc.).

Each grammar model 476 includes the names of entities (i.e., nouns) commonly found in speech about the particular application 290 (i.e., generic terms) to which the grammar model 476 relates, whereas the lexical information 486 is personalized to the user and/or the device from which the input audio data 211 originated. For example, a grammar model 476 associated with a shopping application may include a database of words commonly used when people discuss shopping.

A downstream process called entity resolution (performed by an entity resolution component 570 described below) actually links a portion of text data to an actual specific entity known to the system. To perform entity resolution, the entity resolution component 570 may utilize gazetteer information (484a-484n) stored in an entity library storage 482. The gazetteer information 484 may be used to match text represented in text data output by the ASR component 250 with different entities, such as song titles, contact names, etc. Gazetteers (484a-484n) may be linked to users (e.g., a particular gazetteer 484 may be associated with a specific user's music collection), may be linked to certain applications (e.g., a shopping application, a music application, a video application, a communications application, etc.), or may be organized in a variety of other ways. Entity resolution may also be performed by a specific application 290, for example by a communication application determining which specific entity in a contact list is associated with a name mentioned in a call command.

Each recognizer 463 may also include an intent classification (IC) component 464. The IC component 464 parses text data input thereto to determine an intent(s) associated with the application 290 (associated with the recognizer 463 implementing the IC component 464) that potentially corresponds to the utterance represented in the text data. An intent corresponds to an action to be performed that is responsive to the utterance represented by the text data. The IC component 464 may communicate with a database 478 of words linked to intents. For example, a music intent database may link words and phrases such as "quiet," "volume off," and "mute" to a <Mute> intent. The IC component 464 identifies potential intents by comparing words and phrases in input text data to the words and phrases in an intents database 478 associated with the application 290 that is associated with the recognizer 463 implementing the IC component 464.

The intents identifiable by a specific IC component 464 are linked to application-specific (i.e., the application 290 associated with the recognizer 463 implementing the IC component 464) grammar frameworks 476 with "slots" to be filled. Each slot of a grammar framework 476 corresponds to a portion of the text data that the system believes corresponds to an entity. For example, a grammar framework 476 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 476 may not be structured as sentences, but rather based on associating slots with grammatical tags.

For example, an NER component 462 may parse text data to identify words as subject, object, verb, preposition, etc. based on grammar rules and/or models prior to recognizing named entities in the text data. An IC component 464 (implemented by the same recognizer 463 as the NER component 462) may use the identified verb to identify an intent. The NER component 462 may then determine a grammar model 476 associated with the identified intent. For example, a grammar model 476 for a <PlayMusic> intent may specify a list of slots applicable to play the identified "object" and any object modifier (e.g., a prepositional phrase), such as {Artist Name}, {Album Name}, {Song name}, etc. The NER component 462 may then search corresponding fields in a lexicon 486 associated with the application 290 associated with the recognizer 463 implementing the NER component 462, attempting to match words and phrases in text data the NER component 462 previously tagged as a grammatical object or object modifier with those identified in the lexicon 486.

An NER component 462 may perform semantic tagging, which is the labeling of a word or combination of words according to their type/semantic meaning. An NER component 462 may parse text data using heuristic grammar rules, or a model may be constructed using techniques such as hidden Markov models, maximum entropy models, log linear models, conditional random fields (CRF), and the like. For example, an NER component 462 implemented by a music application recognizer 463 may parse and tag text data including text corresponding to "play mother's little helper by the rolling stones" as {Verb}: "Play," {Object}: "mother's little helper," {Object Preposition}: "by," and {Object Modifier}: "the rolling stones." The NER component 462 identifies "Play" as a verb based on a word database associated with the music application, which an IC component 464 (also implemented by the music application recognizer 463) may determine corresponds to a <PlayMusic> intent. At this stage, no determination has been made as to the meaning of "mother's little helper" and "the rolling stones," but based on grammar rules and models, the NER component 462 has determined that the text of these phrases relates to the grammatical object (i.e., entity) of the hypothesis represented in the text data.

The frameworks linked to the intent are then used to determine what database fields should be searched to determine the meaning of these phrases, such as searching a user's gazetteer 484 for similarity with the framework slots. For example, a framework for a <PlayMusic> intent might indicate to attempt to resolve the identified object based on {Artist Name}, {Album Name}, and {Song Name}, and another framework for the same intent might indicate to attempt to resolve the object modifier based on {Artist Name}, and resolve the object based on {Album Name} and {Song Name} linked to the identified {Artist Name}. If the search of the gazetteer 484 does not resolve a slot/field using gazetteer information, the NER component 462 may search a database of generic words associated with the application 290 (in the knowledge base 472). For example, if the text data includes text corresponding to "play songs by the rolling stones," after failing to determine an album name or song name called "songs" by "the rolling stones," the NER component 462 may search the application vocabulary for the word "songs." In the alternative, generic words may be checked before the gazetteer information, or both may be tried, potentially producing two different results.

An NER component 462 may tag text of a hypothesis represented in text data to attribute meaning to the hypothesis. For example, an NER component 462 may tag "play mother's little helper by the rolling stones" as: {application} Music, {intent} Play Music, {artist name} rolling stones, {media type} SONG, and {song title} mother's little helper. For further example, the NER component 462 may tag "play songs by the rolling stones" as: {application} Music, {intent} Play Music, {artist name} rolling stones, and {media type} SONG.

Figure 5:
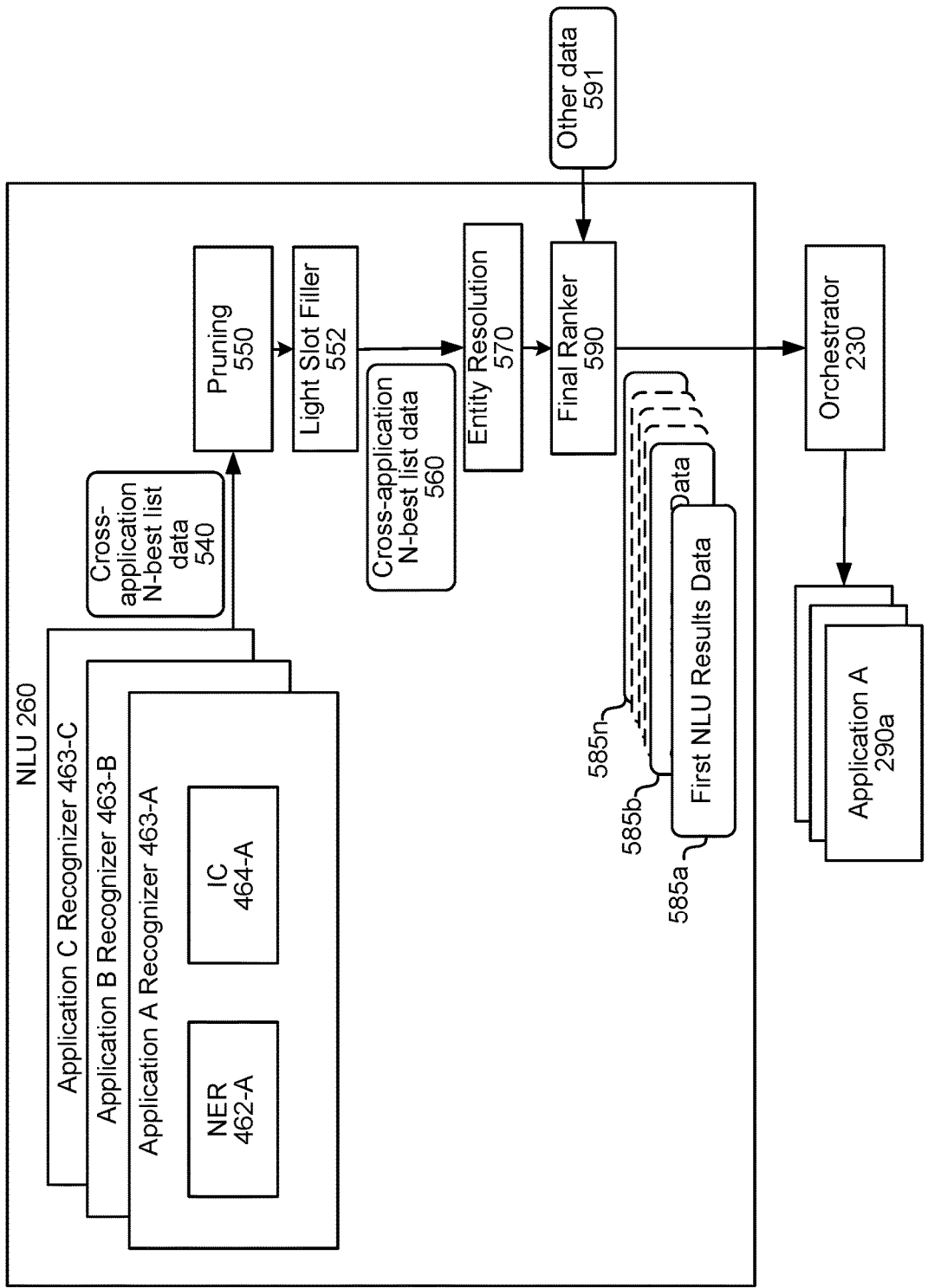
FIG. 5 is a conceptual diagram of how natural language processing is performed according to embodiments of the present disclosure.

The NLU component 260 may generate cross-application N-best list data 540 including the tagged text data output by each recognizer 463 (as illustrated if FIG. 5). A recognizer 463 may output tagged text data generated by an NER component 462 and an IC component 464 operated by the recognizer 463, as described herein above. Each entry of tagged text data represented in the cross-application N-best list data 540 may be associated with a respective score indicating a likelihood that the tagged text data corresponds to the application 290 associated with the recognizer 463 from which the tagged text data was output. For example, the cross-application N-best list data 540 may be represented as:

[0.95] Intent: <Call> RecipientName: Joe
[0.95] Intent: <Call> RecipientName: Jo
[0.01] Intent: <Send Message> RecipientName: Joe
[0.01] Intent: <Send Message> RecipientName: Jo The NLU component 260 may send the cross-application N-best list data 540 to a pruning component 550. The pruning component 550 may sort the tagged text data represented in the cross-application N-best list data 540 according to their respective scores. The pruning component 550 may then perform score thresholding with respect to the cross-application N-best list data 540. For example, the pruning component 550 may select tagged text data represented in the cross-application N-best list data 540 associated with a score satisfying (e.g., meeting and/or exceeding) a threshold score. The pruning component 550 may also or alternatively perform number of tagged text data thresholding. For example, the pruning component 550 may select a maximum threshold number of top scoring tagged text data. The pruning component 550 may generate cross-application N-best list data 560 including the selected tagged text data. The purpose of the pruning component 550 is to create a reduced list of tagged text data so that downstream, more resource intensive, processes may only operate on the tagged text data that most likely correspond to the utterance input to the system.

The NLU component 260 may also include a light slot filler component 552. The light slot filler component 552 can take text from slots represented in the tagged text data output by the pruning component 550 and alter it to make the text more easily processed by downstream components. The light slot filler component 552 may perform low latency operations that do not involve heavy operations such as reference to a knowledge base. The purpose of the light slot filler component 552 is to replace words with other words or values that may be more easily understood by downstream system components. For example, if a tagged text data includes the word "tomorrow," the light slot filler component 552 may replace the word "tomorrow" with an actual date for purposes of downstream processing. Similarly, the light slot filler component 552 may replace the word "CD" with "album" or the words "compact disc." The replaced words are then included in the cross-application N-best list data 560.

The NLU component 260 sends the cross-application N-best list data 560 to an entity resolution component 570. The entity resolution component 570 can apply rules or other instructions to standardize labels or tokens from previous stages into an intent/slot representation. The precise transformation may depend on the application 290. For example, for a travel application, the entity resolution component 570 may transform text data corresponding to "Boston airport" to the standard BOS three-letter code referring to the airport. The entity resolution component 570 can refer to a knowledge base that is used to specifically identify the precise entity referred to in each slot of each tagged text data represented in the cross-application N-best list data 560. Specific intent/slot combinations may also be tied to a particular source, which may then be used to resolve the text data. In the example "play songs by the stones," the entity resolution component 570 may reference a personal music catalog, Amazon Music account, a user profile 302 (described herein), or the like. The entity resolution component 570 may output data including an altered N-best list that is based on the cross-application N-best list represented in the cross-application N-best list data 560, and that includes more detailed information (e.g., entity IDs) about the specific entities mentioned in the slots and/or more detailed slot data that can eventually be used by an application 290. The NLU component 260 may include multiple entity resolution components 570 and each entity resolution component 570 may be specific to one or more applications 290.

The entity resolution component 570 may not be successful in resolving every entity and filling every slot represented in the cross-application N-best list data 560. This may result in the entity resolution component 570 outputting incomplete results. The NLU component 260 may include a final ranker component 590 that assigns a particular confidence score to each portion of tagged text data input therein. The confidence score of tagged text data may represent a confidence of the system in the NLU processing performed with respect to the tagged text data. The confidence score of particular tagged text data may be affected by whether the tagged text data has unfilled slots. For example, if tagged text data associated with a first application includes slots that are all filled/resolved, that tagged text data may be assigned a higher confidence score than other tagged text data including at least some slots that are unfilled/unresolved by the entity resolution component 570.

The final ranker component 590 may apply re-scoring, biasing, or other techniques to determine the top scoring tagged text data. To do so, the final ranker component 590 may consider not only the data output by the entity resolution component 570, but may also consider other data 591. The other data 591 may include a variety of information. For example, the other data 591 may include application rating data. For example, if one application has a high rating, the final ranker component 590 may increase the score of tagged text data output by a recognizer 463 associated with that application. The other data 591 may also include information about applications that have been enabled by the user that input the utterance to the system. For example, the final ranker component 590 may assign higher scores to tagged text data output by recognizers 463 associated with enabled applications than tagged text data output by recognizers 463 associated with non-enabled applications. The other data 591 may also include data indicating system usage history, such as if the user that input the utterance to the system regularly uses a particular application or does so at particular times of day. The other data 591 may additionally include information indicating date, time, location, weather, type of device 110, user ID, context, as well as other information. For example, the final ranker component 590 may consider when any particular application is currently active (e.g., music being played, a game being played, etc.).

Following final ranking, the NLU component 260 may output NLU results data 585. The NLU component 260 may send the NLU results data 585 to the orchestrator component 230, which sends the NLU results data 585 to the one or more applications 290 represented in the NLU results data 585. For example, the NLU results data 585 may include first NLU results data 585a including tagged text data associated with a first application, second NLU results data 585b including tagged text data associated with a second application, etc. The NLU results data 585 may include tagged text data corresponding to the top scoring tagged text data as determined by the final ranker component 590.

Figure 6:
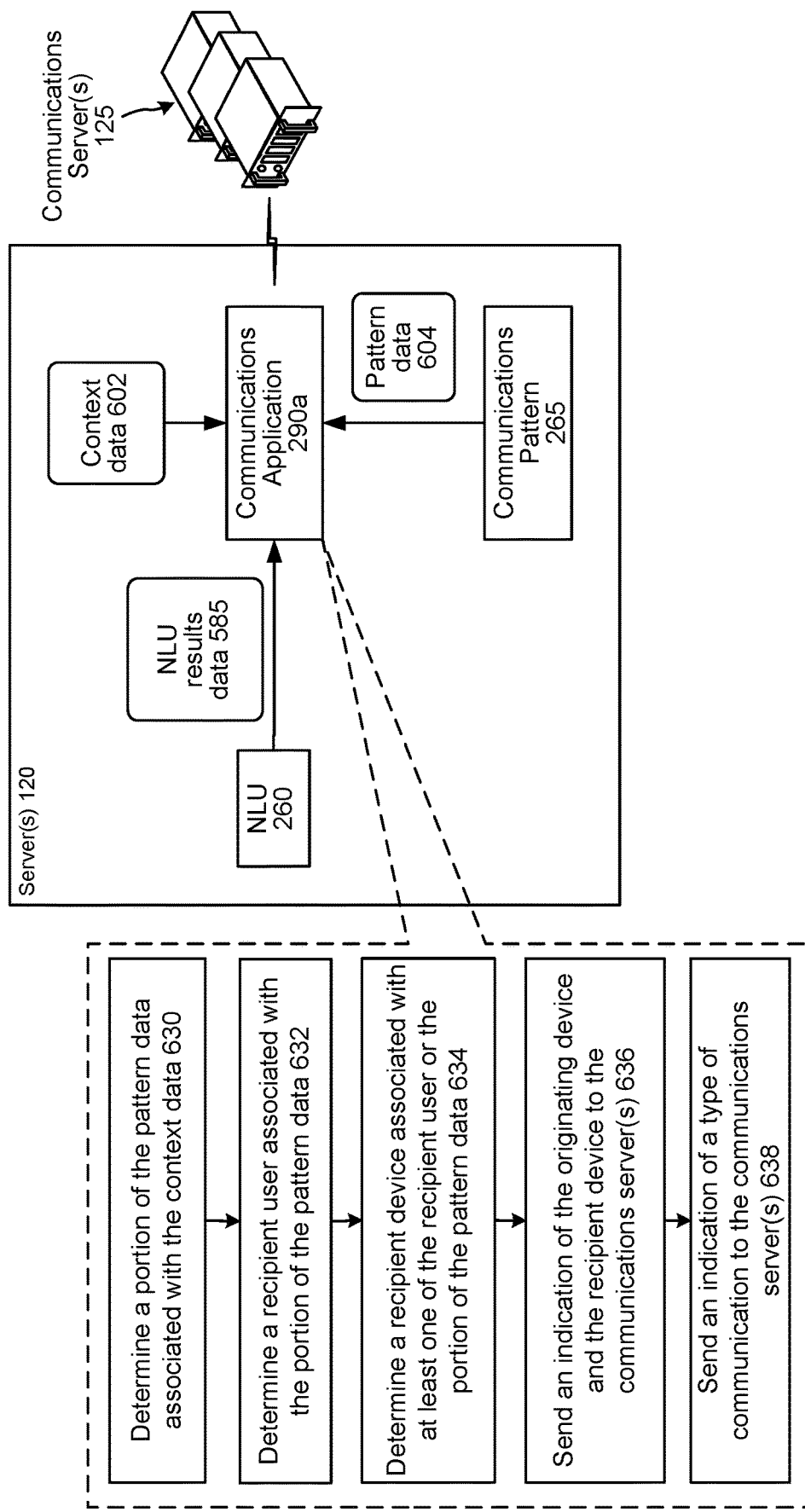
FIG. 6 is a conceptual diagram of how a recipient user is resolved according to embodiments of the present disclosure.

FIG. 6 illustrates how the system may resolve a recipient user 7 post-NLU. The NLU component 260 (or another component of the server(s) 120 such as the orchestrator component 230) sends the NLU results data 585 to a communications application 290a. The NLU results data 585 includes a communications intent (e.g., a <Call> intent, a <SendMessage> intent, etc.) along with text data tagged to indicate one or more entities applicable to processing performed by the communications application 290a. For example, the text data may be tagged to indicate a recipient user 7.

In some instances, the recipient user 7 indicated in the tagged text data input to the communications application 290a may be ambiguous. For example, the tagged text data may indicate the recipient user 7 as being "Joe" and a contact list associated with the originating user 5 may include more than one Joe. For further example, the tagged text data may indicating the recipient user 7 as being "Mom" and the contact list associated with the originating user 5 may include an entry for a person having a name "Mom" and an entry for a restaurant having a name "Mom's Favorite Country Cooking Restaurant." In other instances, the recipient device 110b indicated in the tagged text data input to the communications application 290a may be ambiguous. For example, the tagged text data may indicate an exact recipient user "Joe Smith," but the contact list associated with the originating user 5 may indicate more than one device associated with Joe Smith that is capable of receiving a communication. In these situations, the communications application 290a may be unable to resolve the exact recipient user 7 and/or recipient device 110b, resulting in the communications application 290a being unable to cause the communications server(s) 125 to establish communication between the originating device 110a and an appropriate recipient device 110b.

To resolve an ambiguous recipient user 7 and/or recipient device 110b, the communications application 290a may receive context data 602 representing a current context experienced by the originating user 5 and/or the originating device 110a. The context data 602 may be unrelated to speech processing performed by the speech processing component 240. The context data 602 may include time data indicating a current time or a time when the system received the utterance from the originating user 5. The communications application 290a may receive current time data from an electronic clock component maintained and/or operated by the server(s) 120.

The context data 602 may also include location data indicating a location of the originating device 110a. The communications application 290a may receive the location data from a profile associated with the originating device 110a or a user profile 202 indicating the originating device 110a.

The context data 602 may also include user identifier (ID) data corresponding to a unique ID associated with the originating user 5. The communications application 290a may receive the user ID data from the user recognition component 295.

The context data 602 may also include presence data indicating a number of individuals that are detected by the originating device 110a. The context data 602 may also include data indicating content that is being presented on a display of the originating device 110a. Other types of context data 602 are also possible.

The context data 602 may also include data representing previous messaging and calling information as well as geolocation information. For example, a contact list in the user's phone may represent a contact as "wife." The pattern data 604 may indicate that the user routinely sends "wife" a message when the user is leaving work and calls "wife" when the user is in its car. If a user thereafter messages "wife" from the user's work and says "call Mary" when the user is in its car, the system may resolve "Mary" to the "wife" contact, in the user's contact list, based on the context data 602 and the pattern data 604.

In an example, a user may routinely call a "mom" contact in a contact list on Sunday at 6:00 pm. The system may be configured to determine the user is intending to call "mom" on Sunday at 6:00 pm even if the user's pronunciation of "mom" deviates (for example if the user has a mouth full of food when speaking the command).

The communications application 290a may receive pattern data 604 specific to the originating user 5. The pattern data 604 may represent one or more patterns determined by the communications pattern component 265 with respect to previous communications interactions in which the originating user 5 was involved. The communications application 290a may receive the pattern data 204 in response to the communications application 290a sending (either directly or via the orchestrator component 230) the user ID data associated with the originating user 5 to the communications pattern component 265.

The communications application 290a determines (630) a portion of the pattern data 604 associated with the context data 602. For example, the communications application 290a may determine the context data 602 indicates it is Sunday at 5:58 pm and the originating user 5 spoke the utterance to an originating device 110a located in a kitchen of the originating user's house. The communications application 290a may determine a portion of the pattern data 604 representing a pattern wherein the originating user 5 routinely calls Joe Smith on Sundays around 6:00 pm using the originating device 110a located in the kitchen of the originating user's house. The communications application 290a may determine the aforementioned portion of pattern data 604 is associated with the aforementioned context data 602 based on their substantial similarities. One skilled in the art should appreciate that other context data 602 may be associated with other portions of the pattern data 604 based on their similarities.

The communications application 290a determines (632) a recipient user 7 associated with the portion of the pattern data 604 associated with the context data 602. That is, the communications application 290a determines the recipient user 7 the originating user 5 routinely called, as represented in the portion of the pattern data 604.

The communications application 290a determines (634) a recipient device 110b associated with at least one of the recipient user 7 or the portion of the pattern data 604 associated with the context data 602. The communications application 290a may determine the recipient device 110b using a user profile 302 associated with the recipient user 7.

The communications application 290a sends (636) an indication representing the originating device 110a and the recipient device 110b to the communications server(s) 125. The communications application 290a also sends (638) an indication of a type of communication to the communications server(s) 125. The type of communication may be determined based on the intent representing the utterance. For example, if the utterance is represented by a <Call> intent, the type of communication may correspond to a call. For further example, if the utterance is represented by a <SendMessage> intent, the type of communication may correspond to a message.

If the communication corresponds to a call, the communications server(s) 125 may establish a two-way communication channel between the originating device 110a and the recipient device 110b. If the communication corresponds to a message, the communication server(s) 125 may establish a one-way communication channel through which the message content data is sent to the recipient device 110b.

Prior to establishing a two-way communication channel between the originating device 110a and the recipient device 110b, the communications server(s) 125 or the communications application 290a may generate output text data indicating the recipient user 7 and/or a unique identifier (e.g., phone number) associated with the recipient device 110b. The communications server(s) 125 of the communications application 290a may send the output text data to the TTS component 280, which generates output audio data corresponding to synthesized speech corresponding to the output text data. The system may then cause the originating device 110a to output audio corresponding to the output audio data. If the user inputs a second utterance corresponding to "Alexa, cancel," "cancel," "Alexa, stop," "stop," or the like, the system may cause the communications server(s) 125 to abstain from establishing the two-way communication channel between the originating device 110a and the recipient device 110b. Outputting such a prompt to the originating user 5 enables the originating user 5 to prevent a call from being established with a user that the originating user 5 did not intend on communicating with. For example, such a situation may occur when the originating user 5 intends on perform a non-routine communication with a different user at a time when the originating user 5 usually makes a call to the recipient user 7.

Once the communications application 290a determines a portion of the pattern data 604 associated with the context data 602, the communications application 290a may generate output text data prompting the originating user 5 regarding whether the originating user 5 wants the system to set a reminder with respect to the routine communication. The communications application 290a sends the output text data to the TTS component 280, which generates output audio data corresponding to synthesized speech corresponding to the output text data. The system then causes the originating device 110a to output audio corresponding to the output audio data. For example, the originating device 110a may output synthesized speech corresponding to "I noticed you call Joe smith every Sunday at about 6:00 pm, do you want me to set a reminder?" If the user inputs an indication (e.g., a second utterance, an activation of a virtual button presented on a graphical user interface (GUI), input text response using a virtual keyboard presented on a GUI) that a reminder should be set, the system causes an electronic reminder application to generate a reminder based on the portion of the pattern data 602. For example, if the portion of the pattern data 602 indicates the originating user 5 calls the recipient user 7 on Sundays at about 6:00 pm, the electronic reminder application may generate a reminder for every Sunday at 6:00 pm.

The reminder generated by the electronic reminder application may be location specific. For example, an originating user 5 may routinely call Joe Smith at about 6:00 pm using an originating device 110a located in a kitchen of the originating user's house. The reminder may be configured to only be triggered if conditions precedent are satisfied. According to the above example, the reminder may only be output to the originating user 5 if it is about 6:00 pm and the server(s) 120 receives data (e.g., image data or audio data) indicating the originating user 5 is present in the kitchen of the originating user's house. Image data may indicate the originating user 5 is present if the server(s) 120 determines a representation of the originating user 5 in the image data. Audio data may indicate the originating user 5 is present if the server(s) 120 determines speech of the originating user 5 in the audio data.

It should thus be appreciated that the reminder may further be user ID specific since the system may not want to output a reminder to a user that is not the originating user 5 associated with the reminder. For example, the server(s) 120 may determine a representation of the originating user 5 in image data, as opposed to simply determining a representation of a user in the image data, to prevent the reminder from being output to the wrong user. For further example, the server(s) 120 may determine speech of the originating user 5 in audio data, as opposed to simply determining speech of a user in the audio data, to prevent the reminder from being output to the wrong user.

The communications application 290a may proactively indicate to the originating user 5 that the recipient user 7 is unavailable. After the communications application 290a determines the recipient device 110b, the communications application 290a may send a signal to the recipient device 110b (or other information related to the desired recipient) to provide the system with data that may be processed to determine if the recipient user 7 is "present." If the system receives image data from the recipient device 110b, the system may process the image data to determine a representation of a user. If the system is unable to determine a representation of a user in the image data, the system may send an indication representing the recipient user 7 is unavailable to the communications application 290a. If the system receives audio data from the recipient device 110b, the system may process the audio data to determine speech of a user. If the system is unable to determine speech of a user in the audio data, the system may send an indication representing the recipient user 7 is unavailable to the communications application 290a. Based on receiving the indication, the communications application 290a may generate output text data indicating the recipient user 7 is unavailable. The communications application 290a sends the output text data to the TTS component 280, which generates output audio data corresponding to synthesized speech corresponding to the output text data. The system then causes the originating device 110a to output audio corresponding to the output audio data. For example, the originating device 110a may output synthesized speech corresponding to "Joe Smith does not appear to be available for your routine call, would you like to send him a message," "Joe Smith does not appear available to take your call at their kitchen device. Do you want to call his cell," etc.

As described, the system may determine whether the recipient user 7 is unavailable based on image data or audio data provided by the recipient device 110b. The system may alternatively determine whether the recipient user 7 is unavailable based on data provided by an alarm system associated with the same building (e.g., the recipient user's house) as the recipient device 110b. For example, the system may receive an indication that the alarm system was activated prior to the system receiving the originating utterance from the originating user 5. Based thereon, the communications application 290a may generate output text data indicating the recipient user 7 is unavailable. The communications application 290a sends the output text data to the TTS component 280, which generates output audio data corresponding to synthesized speech corresponding to the output text data. The system then causes the originating device 110a to output audio corresponding to the output audio data. For example, the originating device 110a may output synthesized speech corresponding to "Joe Smith does not appear to be home, would you like to send him a message," "Joe smith does not appear to be home. Do you want to call his cell," etc.

The system may be proactive with respect to a recipient user 7. For example, the system may determine pattern data 604 indicates the recipient user 7 usually receives a call at about 6:00 pm every Sunday. At about 6:25 pm on Sundays the system may output a reminder that the recipient user 7 will likely be receiving a call based on context data 602 including time data and date data. For further example, the system may determine pattern data 604 indicates the recipient user 7 usually receives a call from an originating user 5 when the originating user 5 is cooking dinner. If the system determines the originating user 5 asks the system to output a recipe in the evening based on context data 602 including display content data and time data, the system may output synthesized speech to the recipient user 7 corresponding to "grandma usually calls you when she is cooking dinner and she just asked for a recipe," for example. Yet further, for example, the system may determine pattern data 604 indicates the recipient user 7 usually receives a call from an originating user 5 at about 6:00 pm when the originating user 5 is in their vehicle. If the system determines the originating user 5 is present in their vehicle at 5:58 pm based on context data 602 including time data and presence data, the system may output synthesized speech to the recipient user 7 corresponding to "your wife usually calls you around 6 pm when she is in her car, it is 5:58 pm and she just entered her car."

Figure 7:
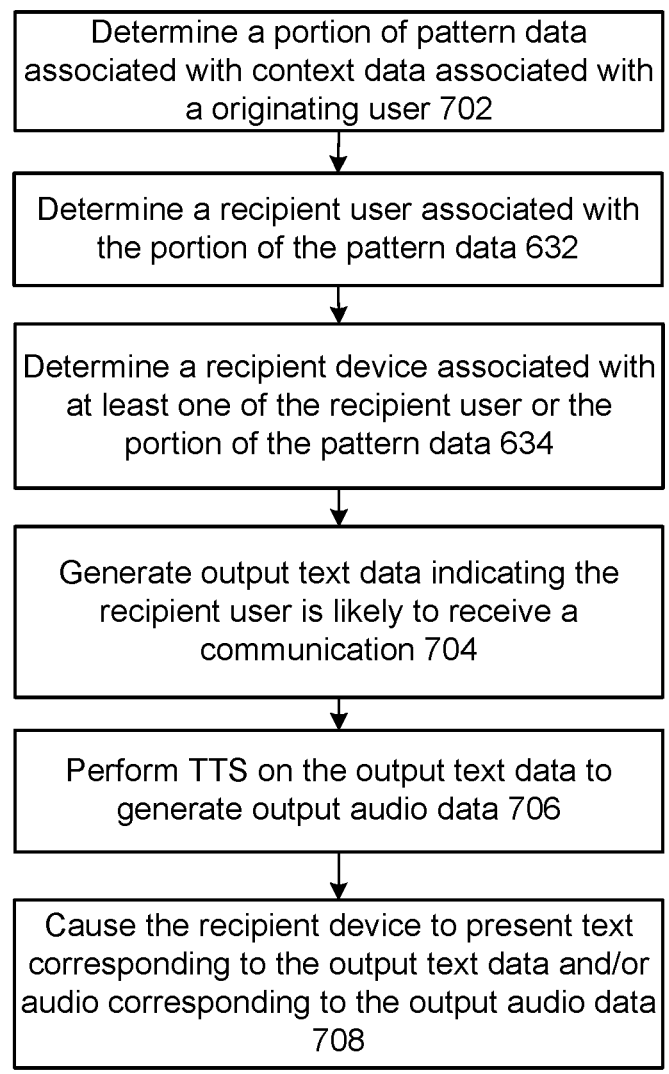
FIG. 7 is a process flow diagram illustrating a method for proactively reminding a recipient user of a likely future communication according to embodiments of the present disclosure.

FIG. 7 illustrates how the server(s) 120 may proactively remind a recipient user 7 of a likely future communication. The server(s) 120 may maintain a store of pattern data 604 and may continually monitor context data 602 of various users of the system. At some point, the system may determine (702) a portion of pattern data 604, associated with an originating user 5, that corresponds to context data 602 associated with a current context experienced by the originating user 5. The server(s) 120 determines (632) a recipient user 7 associated with the portion of the pattern data 604 and determines (634) a recipient device 110b associated with at least one of the recipient user 7 or the portion of the pattern data 604.

The server(s) 120 also generates (704) output text data indicating the recipient user 7 is likely to receive a communication. The server(s) 120 may perform (706) TTS on the output text data to generate output audio data. The server(s) 120 then causes (708) the recipient device 110b to present text corresponding to the output text data and/or audio corresponding to the output audio data.

The system may use pattern data 604 and context data 602 to adjust NLU final rankings. For example, pattern data 604 may indicate a recipient user 7 routinely receives a call using a first communications application at about 6:00 pm on Sundays. On one Sunday at 5:55 pm, a second user (e.g., a family member of the recipient user 7) may input an utterance to the system. The ASR component 250 may process input audio data corresponding to the utterance to generate input text data. The NLU component 260 may process the input text data to generate cross-application N-best list data 560 including first tagged text data associated with the first communications application and second tagged text data associated with a second communications application. The final ranker component 590 may receive pattern data 604 and context data 602 (which may be represented as other data 591 in FIG. 5). The final ranker component 590 may determine the pattern data 604 and the context data 602 indicate the recipient user 7 is expected to receive a call in 5 minutes. Based on this, the final ranker component 590 may decrease an NLU processing score associated with the tagged text data associated with the first communications application and/or increase an NLU processing score associated with the tagged text data associated with the second communications application. This results in the system causing the requested call to be conducted by the second communications application, thereby ensuring the first communications application (which is used to conduct the recipient user's routine call) is free to conduct the routine call.

Figure 8:
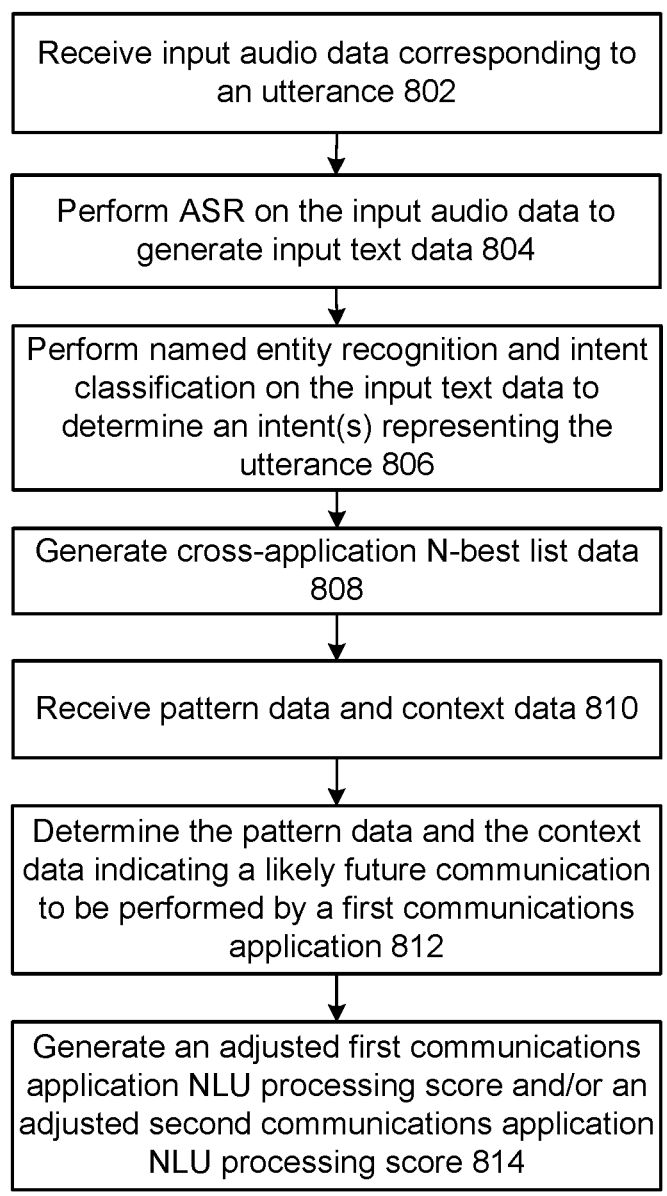
FIG. 8 is a process flow diagram illustrating a method for adjusting natural language understanding final ranking based on pattern data and context data according to embodiments of the present disclosure.

FIG. 8 illustrates how the system may user pattern data 604 and context data 602 to adjust NLU final rankings. The server(s) 120 receives (802) input audio data corresponding to an utterance. The ASR component 250 performs (804) ASR on the input audio data to generate input text data. Recognizers 463 perform (806) named entity recognition and intent classification to determine a first intent representing the utterance and a second intent representing the utterance. The first intent and the second intent may both correspond to <Call> intents. The first intent may be associated with a first communications application and the second intent may be associated with a second communications application. The pruning component 550 generates (808) cross-application N-best list data 560 representing first tagged text data associated with the first intent, the first communications application, and a first communications application NLU processing score; and second tagged text data associated with the second intent, the second communications application, and a second communications application NLU processing score. The final ranker component 590 receives (810) pattern data 604 and context data 602 (represented as other data 591 in FIG. 5). The final ranker component 590 determines (812) the pattern data 604 and the context data 602 indicate a likely future communication to be performed by the first communications application. Based on this, the final ranker component 590 generates (814) an adjusted first communications application NLU processing score by decreasing the first communications application NLU processing score and/or an adjusted second communications application NLU processing score by increasing the second communications application NLU processing score.

The processing performed with respect to FIG. 8 may be user ID specific. Prior to performing NLU processing, the system determines the user that spoken the utterance. If the system determines the user that spoke the utterance is not the recipient user 7 represented in the pattern data 604, the system may engage in the processes illustrated in and described with respect to FIG. 8. If the system determines the user that spoke the utterance is the recipient user 7, the system may instead generate output text data corresponding to "you may receive a call shortly, do you want to proceed with making the requested call," for example. The system may perform TTS on the output text data to generate output audio data. The system may then present output text corresponding to the output text data and/or output audio corresponding to the output audio data to the recipient user 7.

The system may also ensure a recipient device 110b is available to conduct a communication without affecting NLU ranking. Pattern data 604 may indicate a recipient user 7 routinely receives a call at about 6:00 pm on Sundays. The recipient user 7 may routinely enable a privacy mode of the system at about 6:00 pm every day. On Sunday, when the recipient user 7 attempts to enable the privacy mode, the system may, prior to enabling the privacy mode, present the recipient user 7 with text and/or audio corresponding to "you usually receive a call at about 6:00 pm, do you want to proceed with enabling privacy mode," for example. If the recipient user 7 thereafter provides the system with an indication that the recipient user 7 wants to enable the privacy mode, the system may then enable the privacy mode.

Figure 9:
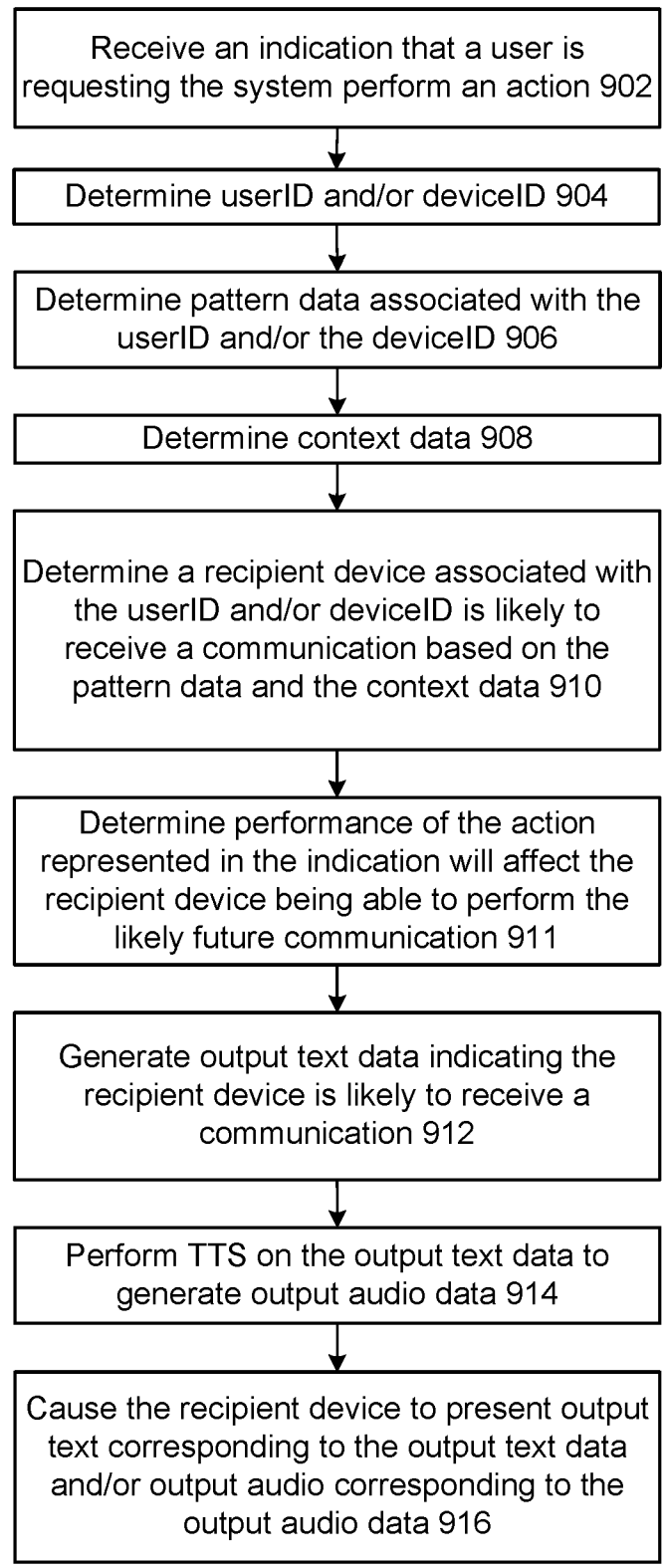
FIG. 9 is a process flow diagram illustrating a method for ensuring a recipient device is available to conduct a communication according to embodiments of the present disclosure.

FIG. 9 illustrates how the server(s) 120 may ensure a recipient device 110b is available to conduct a communication. The server(s) 120 receives (902) an indication that a user is requesting the system perform an action. For example, a user may request the system enable a privacy mode, start playing a movie, start playing music, etc. The server(s) 120 determines (904) a user ID associated with the user and/or a device ID associated with the device that sent the indication to the server(s) 120. The server(s) 120 determines (906) pattern data 604 associated with the user ID and/or the device ID. The server(s) 120 also determines (908) context data 602. The server(s) 120 determines (910) a recipient device 110b associated with the userID and/or device ID is likely to receive a communication based on the pattern data 604 and the context data 602. The server(s) 120 also determine (911) that performance of the action represented in the received indication will (or will likely) affect the recipient device 110b being able to perform the likely future communication. The server(s) 120 then generates (912) output text data indicating the recipient device 110b is likely to receive a communication and soliciting the recipient user 7 regarding whether the recipient user 7 wants to the server(s) 120 to nonetheless perform the requested action represented in the indication. For example, the output text data may correspond to "I understand you want to enable privacy mode. You are likely to receive a call within the next 5 minutes from Joe. Can you confirm I should enable privacy mode?" The server(s) 120 may also perform (914) TTS on the output text data to generate output audio data. The server(s) 120 then causes (916), prior to performing the requested action, the recipient device 110b to present output text corresponding to the output text data and/or output audio corresponding to the output audio data.

Figure 10:
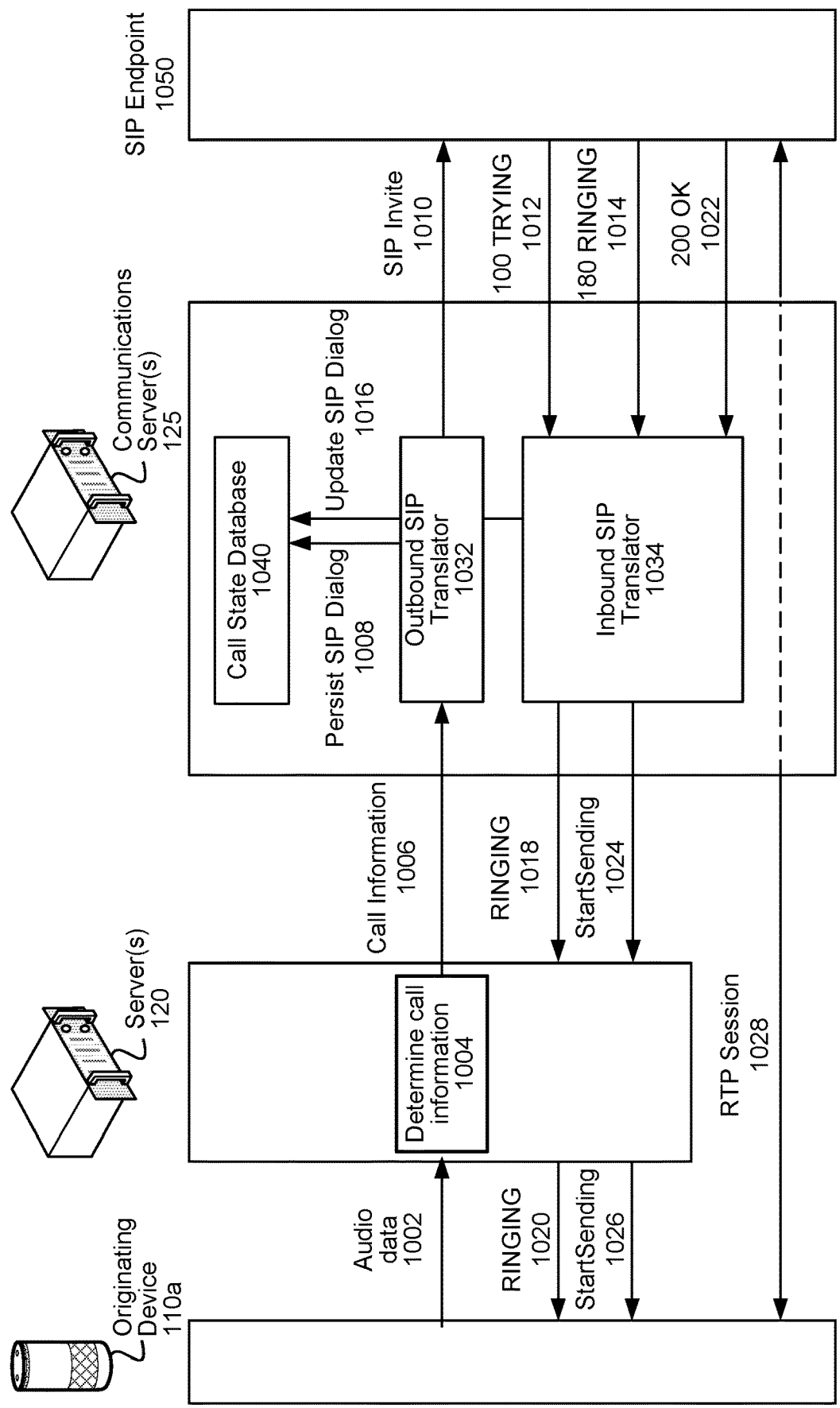
FIG. 10 illustrates an example of signaling to initiate a communication session according to embodiments of the present disclosure.

FIGS. 10-12B below illustrated components that can be used to coordinate communications using a voice controlled system such as that described herein. FIG. 10 illustrates an example of signaling to initiate a communication session according to the present disclosure. In one example configuration, the server(s) 120 is configured to enable voice commands (e.g., perform ASR, NLU, etc. to identify a voice command included in audio data), whereas the communications server(s) 125 is configured to enable communication sessions (e.g., using session initiation protocol (SIP)). For example, the communications server(s) 125 may send SIP messages to endpoints (e.g., the recipient device 110b, etc.) in order to establish a communication session for sending and receiving audio data and/or video data. The communication session may use network protocols such as real-time transport protocol (RTP), RTP Control Protocol (RTCP), Web Real-Time communication (WebRTC) and/or the like. For example, the communications server(s) 125 may send SIP messages to initiate a single RTP media stream between two endpoints (e.g., direct RTP media stream between the originating device 110a and the recipient device 110b) and/or to initiate and facilitate RTP media streams between the two endpoints (e.g., RTP media streams between the originating device 110a and the communications server(s) 125 and between the communications server(s) 125 and the recipient device 110b). During a communication session, the communications server(s) 125 may initiate two media streams, with a first media stream corresponding to incoming audio data from the originating device 110a to the recipient device 110b and a second media stream corresponding to outgoing audio data from the recipient device 110b to the originating device 110a, although for ease of explanation this may be illustrated as a single RTP media stream.

As illustrated in FIG. 10, the originating device 110a may send (1002) audio data to the server(s) 120 and the server(s) 120 may determine (1004) call information using the audio data and may send (1006) the call information to the communications server(s) 125. The server(s) 120 may determine the call information by performing ASR, NLU, etc., as discussed herein above, and the call information may include a data source name (DSN), a number from which to call, a number to which to call, encodings and/or additional information. For example, the server(s) 120 may identify from which phone number the originating user 5 would like to initiate the telephone call, to which phone number the originating user 5 would like to initiate the telephone call, from which device 110 the originating user 5 would like to perform the telephone call, etc.

While FIG. 10 illustrates the server(s) 120 sending the call information to the communications server(s) 125 in a single step (e.g., 1006), the disclosure is not limited thereto. Instead, the server(s) 120 may send the call information to the originating device 110a and the originating device 110a may send the call information to the communications server(s) 125 in order to initiate the telephone call without departing from the disclosure. Thus, the server(s) 120 may not communicate directly with the communications server(s) 125 in step 1006, but may instead instruct the originating device 110a to connect to the communications server(s) 125 in order to initiate the telephone call.

The communications server(s) 125 may include an outbound SIP translator 1032, an inbound SIP translator 1034 and a call state database 1040. The outbound SIP translator 1032 may include logic to convert commands received from the server(s) 120 into SIP requests/responses and may handle sending outgoing SIP requests and sending responses to incoming SIP requests. After receiving the call information, the outbound SIP translator 1032 may persist (1008) a SIP dialog using the call state database 1040. For example, the DSN may include information such as the name, location, and driver associated with the call state database 1040 (and, in some examples, a user identifier (ID) and password of the originating user 5) and the outbound SIP translator 1032 may send a SIP dialog to the call state database 1040 regarding the communication session. The call state database 1040 may persist the call state if provided a device ID and one of a call ID or a dialog ID. The outbound SIP translator 1032 may send (1010) a SIP Invite to a SIP Endpoint 1050, which may be the recipient device 110b, a remote device, a Session Border Controller (SBC), or the like.

The inbound SIP translator 1034 may include logic to convert SIP requests/responses into commands to send to the server(s) 120 and may handle receiving incoming SIP requests and incoming SIP responses. The SIP endpoint 1050 may send (1012) a 100 TRYING message to the inbound SIP translator 1034 and may send (1014) a 180 RINGING message to the inbound SIP translator 1034. The inbound SIP translator 1034 may update (1016) the SIP dialog using the call state database 1040 and may send (1018) a RINGING message to the server(s) 120, which may send (1020) the RINGING message to the originating device 110a.

When the communication session is accepted by the SIP endpoint 1050, the SIP endpoint 1050 may send (1022) a 200 OK message to the inbound SIP translator 1034, the inbound SIP translator 1045 may send (1024) a startSending message to the server(s) 120, and the server(s) 120 may send (1026) the startSending message to the originating device 110a. The startSending message may include information associated with an internet protocol (IP) address, a port, encoding, or the like required to initiate the communication session. Using the startSending message, the originating device 110a may establish (1028) an RTP communication session with the SIP endpoint 1050 via the communications server(s) 125.

While FIG. 10 illustrates the communications server(s) 125 sending the RINGING message and the StartSending message to the originating device 110a via the server(s) 120, the disclosure is not limited thereto. Instead, steps 1018 and 1020 may be combined into a single step and the communications server(s) 125 may send the RINGING message directly to the originating device 110a without departing from the disclosure. Similarly, steps 1024 and 1026 may be combined into a single step and the communications server(s) 125 may send the StartSending message directly to the originating device 110a without departing from the disclosure. Thus, the communications server(s) 125 may communicate with the originating device 110a directly without using the server(s) 120 as an intermediary.

For ease of explanation, the disclosure illustrates the system using SIP. However, the disclosure is not limited thereto and the system may use any communication protocol for signaling and/or controlling communication sessions without departing from the disclosure. Similarly, while some descriptions of the communication sessions refer only to audio data, the disclosure is not limited thereto and the communication sessions may include audio data, video data and/or any other multimedia data without departing from the disclosure.

Figure 11B:
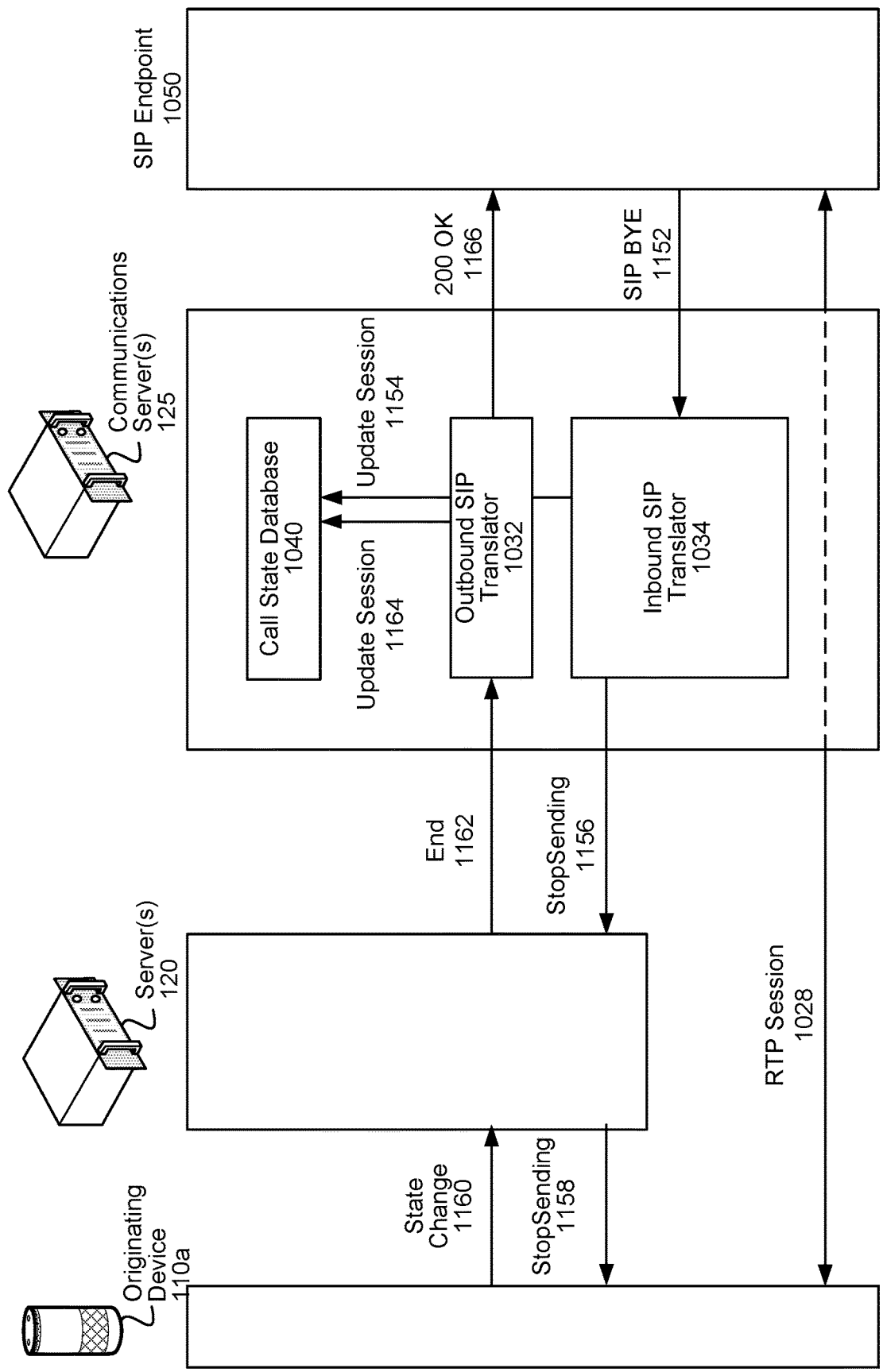

FIGS. 11A-111B illustrate examples of signaling to end a communication session according to the present disclosure. After establishing the RTP communication session 1028 between the originating device 110a and the SIP endpoint 1050, the RTP communication session may be ended by the originating user 5 inputting a command to end the telephone call to the originating device 110a, as illustrated in FIG. 11A, or a the recipient user 7 inputting a command to end the telephone call to the SIP endpoint 1050, as illustrated in FIG. 11B.

As illustrated in FIG. 11A, the originating device 110a may send (1102) a state change message to the server(s) 120 and the server(s) 120 may send (1104) an end message to the communications server(s) 125. The outbound SIP translator 1032 may update (1106) the session using the call state database 1140 and may send (1108) a SIP BYE message to the SIP endpoint 1050. The SIP endpoint 1050 may send (1010) a 200 OK message to the inbound SIP translator 1034 and the inbound SIP translator 1034 may update (1112) the session using the call state database 1140. In some examples, the inbound SIP translator 1034 may send the 200 OK message to the originating device 110a to confirm that the communication session has been ended. Thus, the RTP communication session 1028 may be ended between the originating device 110a and the SIP endpoint 1050.

As illustrated in FIG. 11B, the SIP endpoint 1050 may send (1152) a SIP BYE message to the inbound SIP translator 1034 and the inbound SIP translator 1034 may update (1154) the session using the call state database 1040. The inbound SIP translator 1034 may send (1156) a stopSending message to the server(s) 120 and the server(s) 120 may send (1158) the stopSending message to the originating device 110a. The originating device 110a may send (1160) a state change message to the server(s) 120 and the server(s) 120 may send (1162) an End message to the outbound SIP translator 1032, the End message including a DSN. The outbound SIP translator 1032 may then update (1164) the session using the call state database 1040, and send (1166) a 200 OK message to the SIP endpoint 1050. Thus, the RTP communication session 1028 may be ended between the originating device 110a and the SIP endpoint 1050.

While FIGS. 11A and 11B illustrate the server(s) 120 acting as an intermediary between the originating device 110a and the communications server(s) 125, the disclosure is not limited thereto. Instead, steps 1102 and 1104 may be combined into a single step and the originating device 110a may directly send the state change message and/or the End message to the communications server(s) 125 without departing from the disclosure. Similarly, steps 1156 and 1158 may be combined into a single step and the communications server(s) 125 may send the StopSending message directly to the originating device 110a without departing from the disclosure, and/or steps 1160 and 1162 may be combined into a single step and the originating device 110a may directly send the state change message and/or the End message to the communications server(s) 125 without departing from the disclosure.

While FIGS. 10, 11A, and 11B illustrate the RTP communication session 1028 being established between the originating device 110a and the SIP endpoint 1050, the disclosure is not limited thereto and the RTP communication session 1028 may be established between the originating device 110a and a telephone network associated with the SIP endpoint 550 without departing from the disclosure.

Figure 12A:
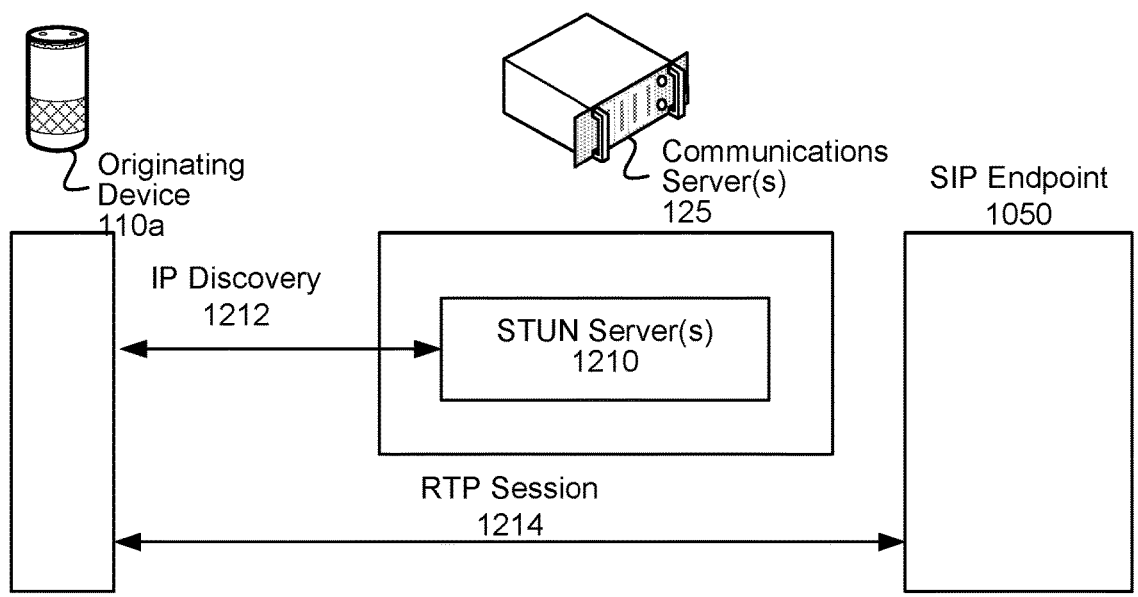
FIG. 12A-12B illustrate examples of establishing media streams between devices according to embodiments of the present disclosure.
Figure 12B:
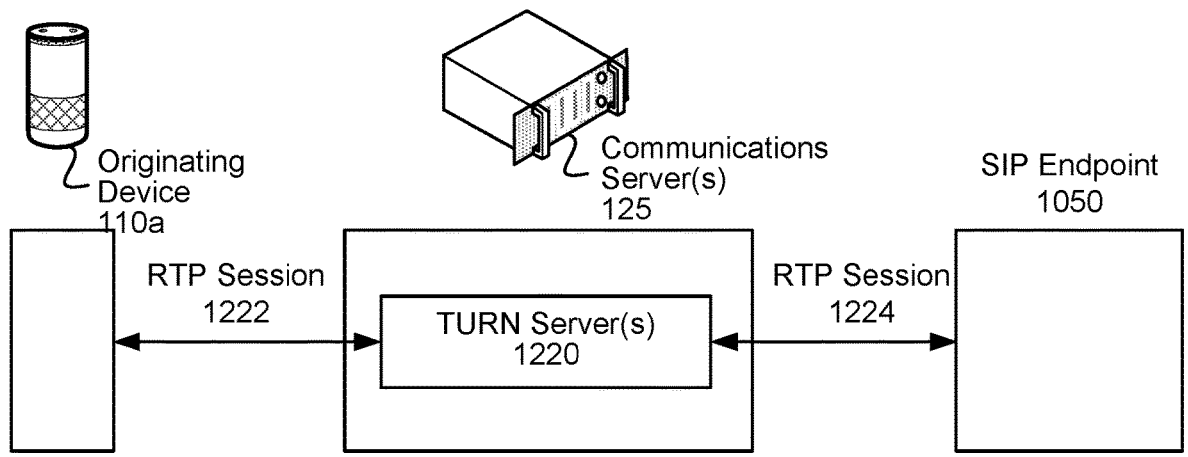

FIG. 12A-12B illustrate examples of establishing media streams between devices according to the present disclosure. In some examples, the originating device 110a may have a publicly accessible IP address and may be configured to establish the RTP communication session directly with the SIP endpoint 1050. To enable the originating device 110a to establish the RTP communication session, the communications server(s) 125 may include Session Traversal of User Datagram Protocol (UDP) Through Network Address Translators (NATs) server(s) (e.g., STUN server(s) 1210). The STUN server(s) 1210 may be configured to allow NAT clients (e.g., device 110 behind a firewall) to setup telephone calls to a VoIP provider hosted outside of the local network by providing a public IP address, the type of NAT they are behind, and a port identifier associated by the NAT with a particular local port. As illustrated in FIG. 11A, the originating device 110a may perform (1212) IP discovery using the STUN server(s) 1210 and may use this information to set up an RTP communication session 1214 (e.g., UDP communication) between the originating device 110a and the SIP endpoint 1050 to establish a telephone call.

In some examples, the originating device 110a may not have a publicly accessible IP address. For example, in some types of NAT the originating device 110a cannot route outside of the local network. To enable the originating device 110a to establish an RTP communication session, the communications server(s) 125 may include Traversal Using relays around NAT (TURN) server(s) 1220. The TURN server(s) 1220 may be configured to connect the originating device 110a to the SIP endpoint 1050 when the originating device 110a is behind a NAT. As illustrated in FIG. 12B, the originating device 110a may establish (1222) an RTP session with the TURN server(s) 1220 and the TURN server(s) 1220 may establish an RTP session with the SIP endpoint 1050. Thus, the originating device 110a may communicate with the SIP endpoint 1050 via the TURN server(s) 1220. For example, the originating device 110a may send outgoing audio data to the communications server(s) 125 and the communications server(s) 125 may send the outgoing audio data to the SIP endpoint 1050. Similarly, the SIP endpoint 1050 may send incoming audio data to the communications server(s) 125 and the communications server(s) 125 may send the incoming audio data to the originating device 110a.

In some examples, the system may establish communication sessions using a combination of the STUN server(s) 1210 and the TURN server(s) 1220. For example, a communication session may be more easily established/configured using the TURN server(s) 1220, but may benefit from latency improvements using the STUN server(s) 1210. Thus, the system may use the STUN server(s) 1210 when the communication session may be routed directly between two devices and may use the TURN server(s) 1220 for all other communication sessions. Additionally or alternatively, the system may use the STUN server(s) 1210 and/or the TURN server(s) 1220 selectively based on the communication session being established. For example, the system may use the STUN server(s) 1210 when establishing a communication session between two devices (e.g., point to point) within a single network (e.g., corporate LAN and/or WLAN), but may use the TURN server(s) 1220 when establishing a communication session between two devices on separate networks and/or three or more devices regardless of network(s). When the communication session goes from only two devices to three or more devices, the system may need to transition from the STUN server(s) 1210 to the TURN server(s) 1220. Thus, the system may anticipate three or more devices being included in the communication session and may establish the communication session using the TURN server(s) 1220.

Figure 14:
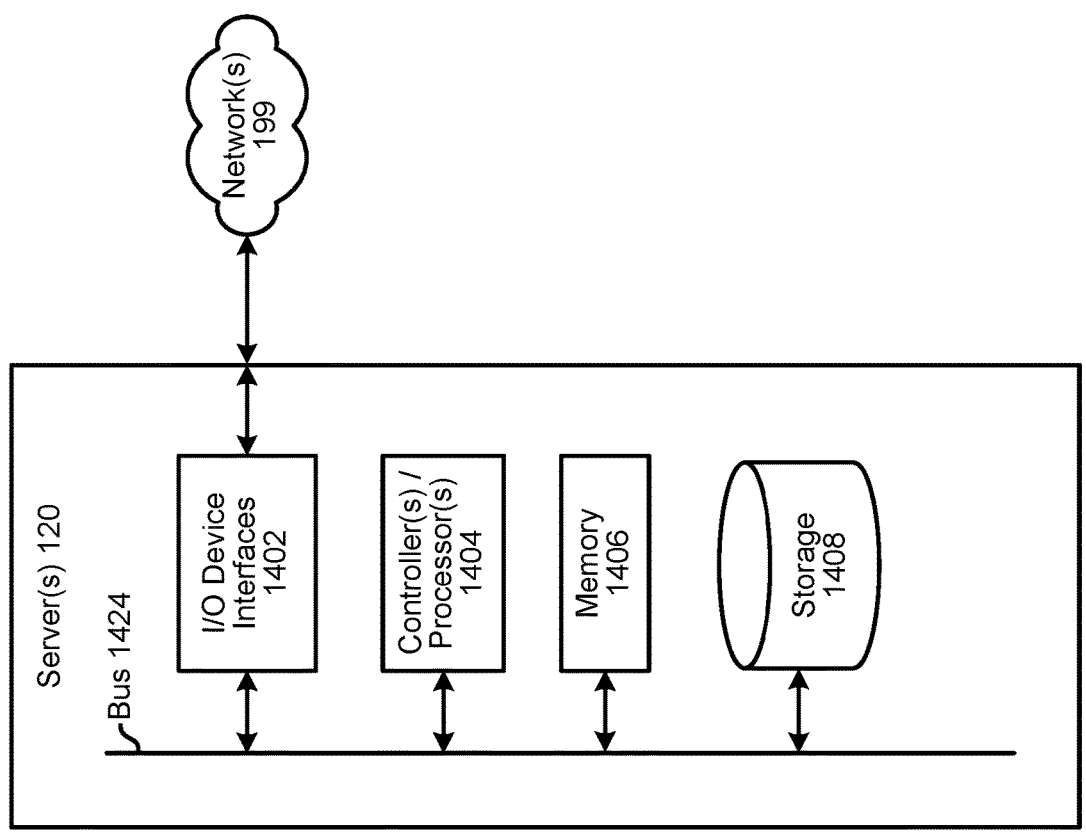
FIG. 14 is a block diagram conceptually illustrating example components of a server according to embodiments of the present disclosure.

FIG. 13 is a block diagram conceptually illustrating a user device 110 that may be used with the system. FIG. 14 is a block diagram conceptually illustrating example components of a remote device, such as the server(s) 120, which may assist with ASR processing, NLU processing, TTS processing, etc. Multiple servers 120 may be included in the system, such as one or more servers 120 for performing ASR processing, one or more servers 120 for performing NLU processing, one or more server(s) 120 performing TTS processing, etc. In operation, each of these devices (or groups of devices) may include computer-readable and computer-executable instructions that reside on the respective device (110/120), as will be discussed further below.

Each of these devices (110/120) may include one or more controllers/processors (1304/1404), which may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive memory (MRAM), and/or other types of memory. Each device (110/120) may also include a data storage component (1308/1408) for storing data and controller/processor-executable instructions. Each data storage component (1308/1408) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1302/1402).

Computer instructions for operating each device (110/120) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (110/120) includes input/output device interfaces (1302/1402). A variety of components may be connected through the input/output device interfaces (1302/1402), as will be discussed further below. Additionally, each device (110/120) may include an address/data bus (1324/1424) for conveying data among components of the respective device. Each component within a device (110/120) may also be directly connected to other components in addition to (or instead of) being connected to other components across the bus (1324/1424).

Referring to FIG. 10, the device 110 may include input/output device interfaces 1302 that connect to a variety of components such as an audio output component such as a speaker 1312, a wired headset or a wireless headset (not illustrated), or other component capable of outputting audio. The device 110 may also include an audio capture component. The audio capture component may be, for example, a microphone 1320 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1316 for displaying content.

Via antenna(s) 1314, the input/output device interfaces 1302 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment. The I/O device interface (1302/1402) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (1302/1402), processor(s) (1304/1404), memory (1306/1406), and/or storage (1308/1408) of the device(s) 110 and server(s) 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are exemplary, and may be located as a stand-alone device or may be included, in whole or in part, as a component of a larger device or system.

Figure 15:
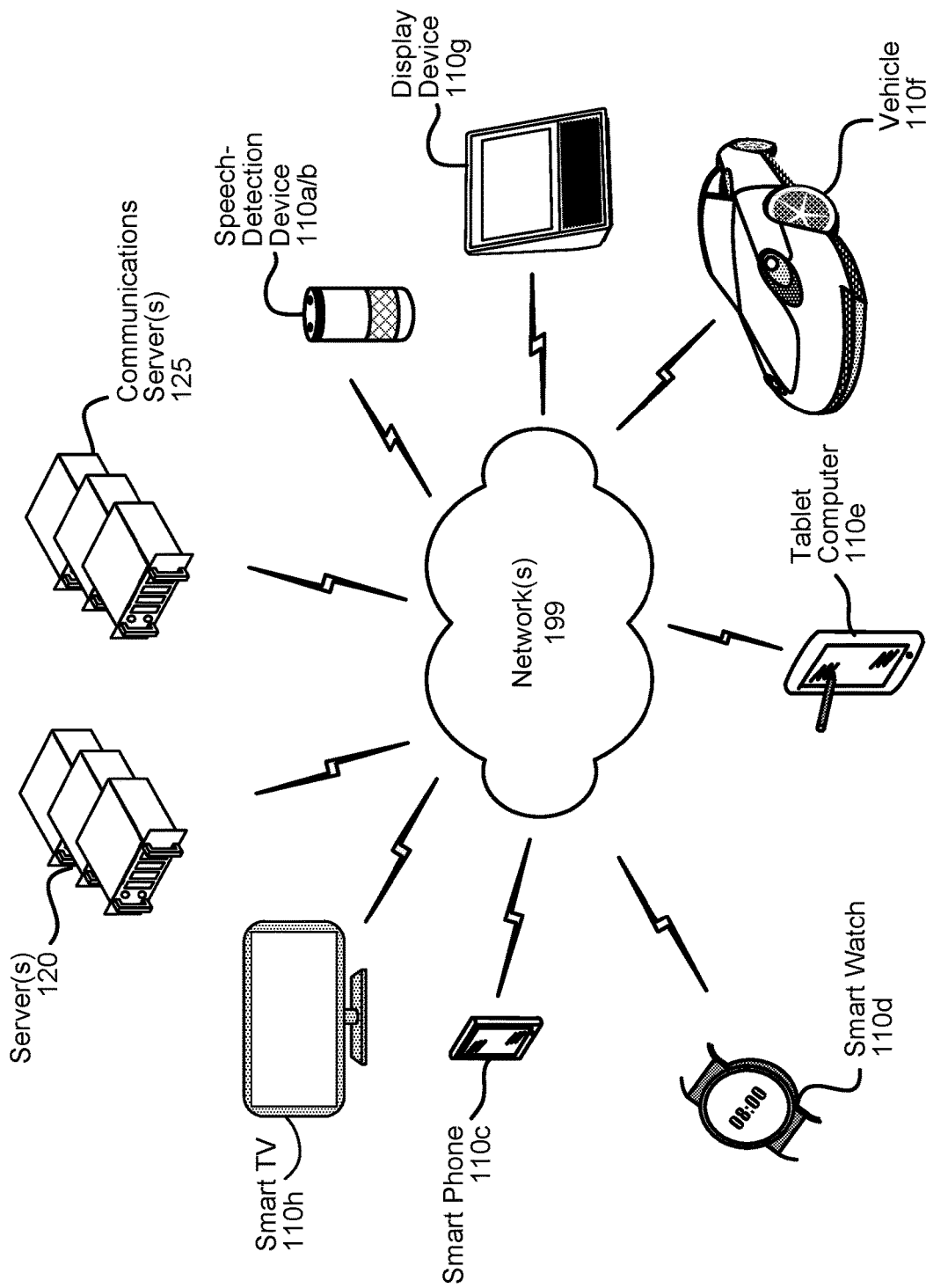
FIG. 15 illustrates an example of a computer network for use with the speech processing system.

As illustrated in FIG. 15, multiple devices (110a-110h, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a/b, a smart phone 110c, a smart watch 110d, a tablet computer 110e, a vehicle 110f, a display device 110g, and/or a smart TV 110h may be connected to the network(s) 199 through a wireless service provider, over a WiFi or cellular network connection, or the like. Other devices are included as network-connected support devices, such as the server(s) 120, communications server(s) 125, or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, from a first device, first audio data corresponding to a first utterance;
performing speech processing on the first audio data to determine the first utterance corresponds to a first request to establish a first two-way communication session and indicates a first recipient name;
determining the first recipient name corresponds to a first user name associated with a first user profile and a second user name associated with a second user profile;
determining communications history data associated with the first device, the communications history data corresponding to at least one previous two-way communication session involving the first device and another device;
determining, based at least in part on the communications history data, that the first two-way communication session is to be performed using the first user profile instead of the second user profile;
determining a second device associated with the first user profile; and
causing the first two-way communication session to be established with the first device and the second device.

2. The computer-implemented method of claim 1, further comprising:
receiving, from the first device, an indication to enable a privacy mode;
determining, based at least in part on the communications history data, that the first device is likely to receive at least one of an incoming two-way communication request or an incoming message;
generating first data representing the first device is likely to receive at least one of the incoming two-way communication request or the incoming message; and
causing the first device to output the first data prior to enabling the privacy mode.

3. The computer-implemented method of claim 1, further comprising:
receiving, from the first device, second audio data corresponding to a second utterance;
performing speech processing on the second audio data to generate:
first data associated with a first communications application and a first confidence score, and
second data associated with a second communications application and a second confidence score;
determining, based at least in part on the communications history data, that the first device is likely to receive, via the first communications application, at least one of an incoming two-way communication request or an incoming message; and
generating, based at least in part on determining the first device is likely to receive at least one of the incoming two-way communication request or the incoming message, at least one of:
an adjusted first confidence score that is less than the first confidence score, or
an adjusted second confidence score that is greater than the second confidence score.

4. A system comprising:
at least one processor; and
at least one memory including instructions that, when executed by the at least one processor, cause the system to:
receive, from a first device, first audio data corresponding to a first utterance;
perform speech processing on the first audio data to determine the first utterance corresponds to a first recipient name and a first request to establish a first two-way communication session;
determine a first user profile associated with the first recipient name;
determine the first user profile indicates a second device and a third device;
determine communications history data associated with the first device, the communications history data corresponding to previous communications involving the first device;

determine, based at least in part on the communications history data, that the first two-way communication session is to be performed using the second device instead of the third device;

determine, based at least in part on the communications history data, that the first device is likely to receive at least one of a first incoming two-way communication request or a first incoming message;

generate first data representing the first device is likely to receive at least one of the first incoming two-way communication request or the first incoming message; and cause the first device to output the first data prior to causing the first two-way communication session to be established with the first device and the second device.

5. The system of claim 4, wherein the at least one memory further includes instructions that, when executed by the at least one processor, further cause the system to:

receive, from the first device, second audio data corresponding to a second utterance;

perform speech processing on the second audio data to determine the second utterance corresponds to a second recipient name and a second request to establish a second two-way communication session;

determine the second recipient name corresponds to a first user name associated with a second user profile and a second user name associated with a third user profile;

determine, based at least in part on the communications history data, that the second two-way communication session is to be performed using the second user profile instead of the third user profile;

determine a fourth device associated with the second user profile; and cause the second two-way communication session to be established with the first device and the fourth device.

6. The system of claim 4, wherein the at least one memory further includes instructions that, when executed by the at least one processor, further cause the system to:

generate second data indicating the first two-way communication session will be established with the first device and the second device; and cause the first device to output the second data prior to causing the first two-way communication session to be established.

7. The system of claim 4, wherein the at least one memory further includes instructions that, when executed by the at least one processor, further cause the system to:

receive, from the first device, an indication to enable a privacy mode;

determine, based at least in part on the communications history data, that the first device is likely to receive at least one of a second incoming two-way communication request or a second incoming message;

generate second data representing the first device is likely to receive at least one of the second incoming two-way communication request or the second incoming message; and cause the first device to output the second data.

8. The system of claim 4, wherein the at least one memory further includes instructions that, when executed by the at least one processor, further cause the system to:

receive, from the first device, second audio data corresponding to a second utterance;

perform speech processing on the second audio data to generate:

second data associated with a first communications application and a first confidence score, and third data associated with a second communications application and a second confidence score;

determine, based at least in part on the communications history data, that the first device is likely to receive, via the first communications application, at least one of a second incoming two-way communication request or a second incoming message; and generate, based at least in part on determining the first device is likely to receive at least one of the second incoming two-way communication request or the second incoming message, at least one of:

an adjusted first confidence score that is less than the first confidence score, or an adjusted second confidence score that is greater than the second confidence score.

9. The system of claim 4, wherein the at least one memory further includes instructions that, when executed by the at least one processor, further cause the system to:

determine, based at least in part on the communications history data, second data corresponding to a prompt to create a recurring reminder to initiate future two-way communication sessions with the second device; and cause the first device to output the second data.

10. A computer-implemented method comprising:

receiving, from a first device, first audio data corresponding to a first utterance;

performing speech processing on the first audio data to determine the first utterance corresponds to a first recipient name and a first request to establish a first two-way communication session;

determining a first user profile associated with the first recipient name;

determining the first user profile indicates a second device;

determining communications history data associated with the first device, the communications history data corresponding to previous communications involving the first device;

determining, based at least in part on the communications history data, that the first device is likely to receive at least one of a first incoming two-way communication request or a first incoming message while the first two-way communication session is being performed;

generating first data representing the first device is likely to receive at least one of the first incoming two-way communication request or the first incoming message while the first two-way communication session is being performed;

causing the first device to output the first data; and causing, after outputting the first data, the first two-way communication session to be established with the first device and the second device.

11. The computer-implemented method of claim 10, further comprising:

receiving, from the first device, second audio data corresponding to a second utterance;

performing speech processing on the second audio data to determine the second utterance corresponds to a second recipient name and a second request to establish a second two-way communication session;

determining the second recipient name corresponds to a first user name associated with a second user profile and a second user name associated with a third user profile;

determining, based at least in part on the communications history data, that the second two-way communication session is to be performed using the second user profile instead of the third user profile;

determining a third device associated with the second user profile; and causing the second two-way communication session to be established with the first device and the third device.

12. The computer-implemented method of claim 10, further comprising:

generating second data indicating the first two-way communication session will be established with the first device and the second device; and causing the first device to output the second data prior to causing the first two-way communication session to be established.

13. The computer-implemented method of claim 10, further comprising:

receiving, from the first device, an indication to enable a privacy mode;

determining, based at least in part on the communications history data, that the first device is likely to receive at least one of a second incoming two-way communication request or a second incoming message;

generating second data representing the first device is likely to receive at least one of the second incoming two-way communication request or the second incoming message; and causing the first device to output the second data.

14. The computer-implemented method of claim 10, further comprising:

receiving, from the first device, second audio data corresponding to a second utterance;

performing speech processing on the second audio data to generate:
second data associated with a first communications application and a first confidence score, and
third data associated with a second communications application and a second confidence score;

determining, based at least in part on the communications history data, that the first device is likely to receive, via the first communications application, at least one of a second incoming two-way communication request or a second incoming message; and generating, based at least in part on determining the first device is likely to receive at least one of the second incoming two-way communication request or the second incoming message, at least one of:
an adjusted first confidence score that is less than the first confidence score, or
an adjusted second confidence score that is greater than the second confidence score.

15. The computer-implemented method of claim 10, further comprising:

determining, based at least in part on the communications history data, second data corresponding to a prompt to create a recurring reminder to initiate future two-way communication sessions with the second device; and causing the first device to output the second data.

16. The computer-implemented method of claim 1, further comprising:

generating first data indicating the first two-way communication session will be established with the first device and the second device; and causing the first device to output the first data prior to causing the first two-way communication session to be established.

17. The computer-implemented method of claim 1, further comprising:

receiving, from the first device, second audio data corresponding to a second utterance;

performing speech processing on the second audio data to determine the second utterance corresponds to a second request to establish a second two-way communication session and indicates a second recipient name;

determining a third user profile associated with the second recipient name;

determining the third user profile indicates a third device and a fourth device;

determining, based at least in part on the communications history data, that the second two-way communication session is to be performed using the third device instead of the fourth device; and causing the second two-way communication session to be established with the first device and the third device.

18. The computer-implemented method of claim 1, further comprising:

determining, based at least in part on the communications history data, first data corresponding to a prompt to create a recurring reminder to initiate future two-way communication sessions with the second device; and causing the first device to output the first data.

* * * * *